US007796026B1

(12) United States Patent
Jorgensen et al.

(10) Patent No.: US 7,796,026 B1
(45) Date of Patent: Sep. 14, 2010

(54) COMMUNICATION PATH FOR EXTREME ENVIRONMENTS

(75) Inventors: Charles C. Jorgensen, Palo Alto, CA (US); Bradley J. Betts, Burlingame, CA (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 1141 days.

(21) Appl. No.: 11/111,620

(22) Filed: Apr. 20, 2005

(51) Int. Cl.
G08B 1/08 (2006.01)
(52) U.S. Cl. .................. 340/539.11; 340/572.1
(58) Field of Classification Search ............ 340/539.11, 340/572.1, 686.1, 825.49, 10.1, 573.1, 586.1
See application file for complete search history.

(56) References Cited

U.S. PATENT DOCUMENTS

| 5,689,238 | A * | 11/1997 | Cannon et al. ............ 340/572.1 |
| 2001/0036832 | A1 * | 11/2001 | McKay ....................... 455/456 |
| 2005/0231359 | A1 * | 10/2005 | Kampel et al. ......... 340/539.13 |
| 2005/0237193 | A1 * | 10/2005 | Namm et al. ............ 340/572.1 |

* cited by examiner

*Primary Examiner*—Phung Nguyen
(74) *Attorney, Agent, or Firm*—John Schippar; Robert Padilla; Diana Cox

(57) ABSTRACT

Methods and systems for using one or more radio frequency identification devices (RFIDs), or other suitable signal transmitters and/or receivers, to provide a sensor information communication path, to provide location and/or spatial orientation information for an emergency service worker (ESW), to provide an ESW escape route, to indicate a direction from an ESW to an ES appliance, to provide updated information on a region or structure that presents an extreme environment (fire, hazardous fluid leak, underwater, nuclear, etc.) in which an ESW works, and to provide accumulated thermal load or thermal breakdown information on one or more locations in the region.

37 Claims, 17 Drawing Sheets

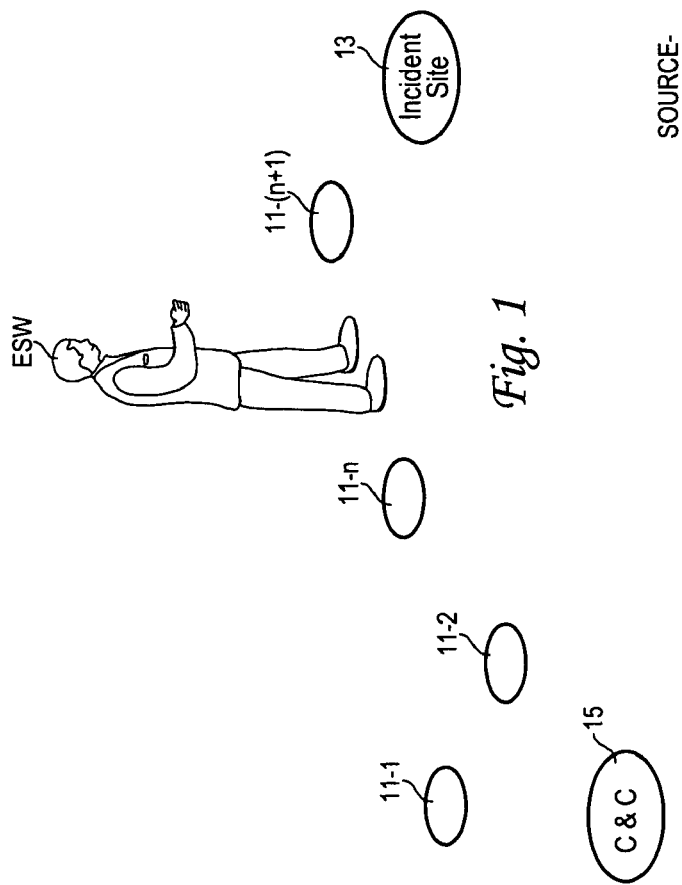

COMMUNICATION PATH FOR EXTREME ENVIRONMENTS

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to reliable communication of information in an extreme environment, including an emergency site.

BACKGROUND OF THE INVENTION

Firefighters and other emergency service workers who actively work in extreme environments (e.g., in the presence of low visibility, high temperature, high pressure, high toxicity, high auditory intensity or low oxygen content) often utilize a "buddy touch" system; wherein a lead worker sets a path on hands and knees, and each succeeding worker maintains touch contact with the preceding worker's legs or other extremities, while sweeping his/her own limbs to locate victims and/or obstacles. During this procedure, which is both slow and dangerous, a fire hose and/or emergency service delivery line and/or communications line may be pulled along as well to serve immediate emergency needs and to serve as an escape path. Given the possibility for encountering local extreme environments (heat pockets, high toxic chemical content, collapsed areas, etc.) and/or the possibility of escape path blockages, a safe, reliable and low cost alternative is clearly needed that also provides information to command and control personnel concerning (1) the present condition of the active workers, (2) the present conditions in and around the incident site, and (3) the present conditions adjacent to a chosen escape path.

What is needed is a communication system that facilitates reliable communication of information, including location and present condition of the active worker(s), local temperature and other relevant local environmental variable values and relevant changes in these values between one or more persons within an extreme environment and one or more sub-systems located outside this extreme environment. Preferably, the system should be flexible so that the variables whose values are communicated can be changed by one of the communicators and should permit both automatic reporting and volitional reporting.

SUMMARY OF THE INVENTION

These needs are met by the invention, which provides a sequence of path communicators, based on devices such as radio frequency identifier devices ("RFIDs"), or other suitable signal transmitters ("STs") and/or signal receivers ("SRs") and/or signal transceivers ("STCs"), that communicate with each other and define one or more communication paths, including redundant paths if desired, between a group of one or more persons (the "active group") working in an extreme environment and one or more sub-systems located in a non-extreme environment. As referred to herein, an "extreme environment" includes the presence of at least one of, but is not limited to, high pressure, high temperature, relatively high concentration of a toxic or noxious gas, relatively low oxygen content, high auditory intensity, high electromagnetic intensity, high visible or near-visible lighting, low or non-existent visible lighting, high nuclear flux.

In a first embodiment, as the active group moves toward and/or works within the extreme environment, the active group distributes a sequence of spaced apart RFID devices or other devices providing similar features that communicate with each other, preferably but not necessarily in a selected order of communication. A first RFID signal format provides a preamble including sensor data for many kinds of sensors and identifying the source RFID for this information. In second and third embodiments, one or a small group of RFIDs or other STs or STCs provides location and spatial orientation for an emergency services worker (ESW). In a fourth embodiment, a sequence of RFIDs serves as an escape route for an ESW, by providing an audibly or visually perceptible sequence of signals that indicate a path toward an exit. In a fifth embodiment, an RFID with angle-dependent output signal indicates a location of an emergency service (ES) appliance, such as a fire hose. In a sixth embodiment, an interrogatable RFID or similar receiver appliance provides information locally concerning conditions at a site and/or results of the most recent inspection of the site. In seventh and eighth embodiments, a thermal sensing RFID or similar thermal sensing device indicates the present thermal condition of the site, relative to a critical site condition that is associated with extreme danger.

An RFID is a small radio transmitter, receiver and sensor that can be used, for example, for inventories and to facilitate labeling in a commercial activity. An RFID can be queried, within its transmission range (23 feet in one version), by a hand held device to reveal stored information. Each RFID can have a size as small as a U.S. nickel, but is preferably somewhat larger if a plurality of RFIDs is to be distributed in a sequence according to a plan. In some embodiments disclosed here, an RFID is programmed to automatically transmit selected information at a sequence of specified times, or upon demand.

One version of an RFID operates at about 433 MHz, but this frequency can be varied somewhat to provide distinguishable frequencies among a sequence of RFIDs. Presently, two RFIDs can reliably communicate with each other over a range of up to about 7 meters (approximately 23 feet) in almost any reasonable environment, in temperatures ranging from −40° F. to 185° F., at a rate of 1.8-2.2 pulses/sec. Additional communication range, up to 50-300 feet, can be obtained by supplementing the RFIDs with an external package. Two or more RFID devices use RS232 or RS485 or Ethernet TCP/IP communication protocol to communicate with each other, serial format, in simplex or half duplex modes. A signal transmitted or received by an RFID may be expressed in 256-2048 bits. A given RFID may be read/write (RW)_ or may be read only (RO), may have a diameter of between 0.625 and 3.75 inches, and may be used with an antenna cable of any reasonable length. Up to four antennas can be linked to a single RFID device, as presently available. Optionally, an RFID system of devices, available from RFID, Inc. in Aurora, Colo. and from other suppliers, includes a handheld reader or reader-programmer, operating at 2.45 GHz, with up to 24 Mbytes of memory. RFIDs are one of several short range wireless communication systems that can be used here.

BRIEF DESCRIPTION OF THE DRAWINGS

FIG. 1 schematically illustrates distribution of a sequence of RFID devices by an ESW in or near an extreme environment.

FIG. 2 illustrates a suitable RFID signal format.

DESCRIPTION OF THE BEST MODES OF THE INVENTION

First Embodiment. Sensor Communications

Figure 3:
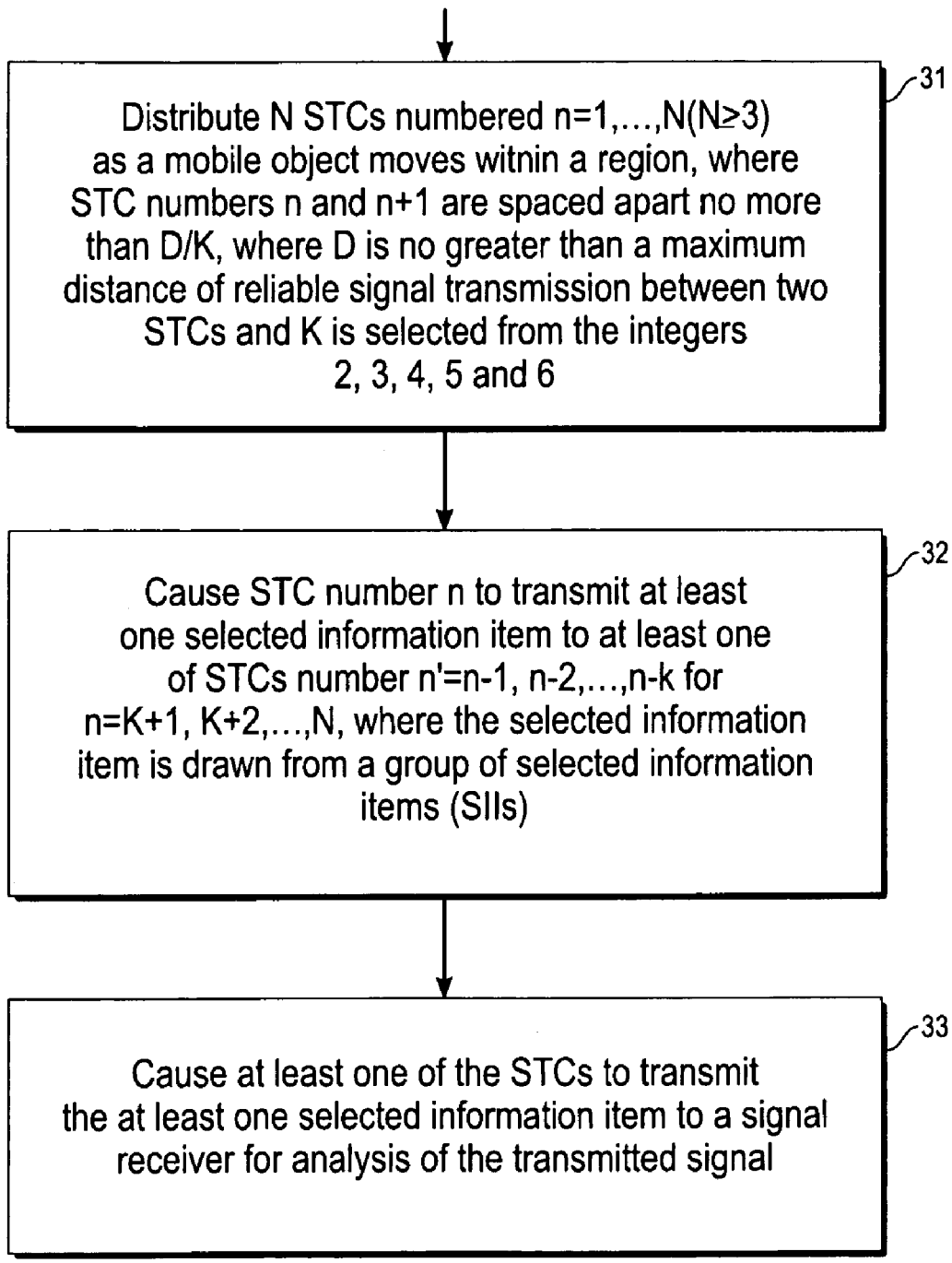
FIG. 3 is a flow chart of a procedure for the embodiment in FIG. 1.

In a first embodiment of the invention, illustrated in FIG. 1, an emergency service worker ("ESW") drops or otherwise positions a sequence of N RFIDs 11-n (n=1, . . . , N) or other suitable signal transceivers (collectively referred to as "STCs"), having nearest neighbor distances of no more than the active communication range for presently available versions of the STCs (e.g., about 23 feet for one version of an RFID) as the ESW moves toward or within an incident site 13 having an extreme environment. The STCs are preferably configured to communicate with each other in an ordered sequence, with built in redundancy, and with a command and control ("C&C") sub-system 15 nearby.

For example, where a sequence of N STCs, numbered n= 1, . . . , N, are used (N≧3), device number n (≧3) communicates with devices number n−2, n−1, n+1 and n+2 and thus receives and/or provides redundant information with devices n−2 and n−1, and receives and/or provides redundant information with devices number n+1 and n+2. This redundancy allows STC device number n to communicate information to STC device number n−2, even if device number n−1 is inoperative. This second order redundancy can be extended to Kth order redundancy (K≧2), whereby STC device number n receives and/or provides redundant information with devices n−K, n−(K−1), . . . , n−2, n−1, and receives and/or provides redundant information with devices n+1, n+2, . . . , n+(k-1), n+K, with a corresponding reduction in probability that a signal received or generated at device number n will not be successfully passed up the line and/or down the line because of inoperability of another STC in the sequence. Where Kth order redundancy is built in, it is preferable that the nearest neighbor distance between adjacent STCs be no greater than D/K, where D is a maximum communication range between two STC devices.

One or more STCs in the sequence may include a thermal sensor, a barometric sensor, one or more chemical sensors, an electromagnetic sensor, a noise sensor and/or one or more nuclear particle sensors associated therewith in order to provide selected information on the environment at and adjacent to the incident site. A signal transmitted by a STC may thus include one or more of the following sensor information items (collectively referred to as "SII items"): time of transmission; STC no. for the source of the information; location and/or orientation of the transmitting STC (not necessarily the source); temperature at the transmitting STC location; pressure at the transmitting STC location; concentration of specified chemical or compound at the transmitting STC location; electromagnetic field intensity at the transmitting STC location; visible light index at the transmitting STC location; average noise intensity at the transmitting STC location; peak noise intensity at the transmitting STC location; flux of nuclear particles (alpha, beta, gamma and/or ion) at the transmitting STC location; and estimated oxygen content at the transmitting STC location. The STC signal is passed to, received by and analyzed by a command and control ("C&C") sub-system that is located near the incident site. The C&C sub-system preferably monitors the time of transmission associated with the received sensor signal and monitors any significant change with time of the sensor signal, in order to identify an approach to a critical value at or near a location of one of the transmitting STCs.

Where the RFID signal or other STC signal has a relatively large number of bits available (256-2048 in the present versions), an RFID signal can include protocol signals and a substantial amount of data. If a single RFID signal from a given source-RFID device cannot carry all the data, two or more RFID signals or packets can be coordinated and used to transmit the data. FIG. 2 illustrates a suitable format for an RFID signal RFIDS-1 that can be used for transmitting data between the source-RFID and the C&C sub-system. An initial block of 8 bits (or more, if desired) optionally includes preamble bits (e.g., 7E or 01111110), followed by: (1) 8 bits that identify the source-RFID by number (e.g., n=0-255); (2) 12 bits that indicate the date and time (to the nearest sec) the RFID signal is initially sent by the source-RFID; (3) 8 bits that identify the RFID (no.) that last (received or generated and) transmitted this signal (the source-RFID or an intermediate RFID in the chain of signal passage); (4) 16 coded bits used to determine or estimate the location and/or spatial orientation of the ESW who wears or carries the source-RFID; (5) 8 bits indicating the estimated temperature at the source-RFID location; (6) 8 bits indicating the estimated pressure at the source-RFID location; (7) 8 bits indicating the estimated concentration of a specified chemical or compound at the source-RFID location (more than one concentration can be transmitted); (8) 8 bits indicating the estimated electromagnetic field intensity at the source-RFID location; (9) 8 bits indicating a visible light index at the source-RFID location; (10) 8 bits indicating an average noise intensity at the source-RFID location; (11) 8 bits indicating a peak noise intensity at the source-RFID location; (12) 8 bits estimating the flux of nuclear particles (alphas, betas, gammas and/or ions) at the source-RFID location; (13) 8 bits indicating the estimated oxygen content at the source-RFID location; and (14) an 8-bit pattern (e.g., 10000001) representing a post-amble or closing sequence. If a measurement, among the preceding items (5)-(13), is not included, the corresponding 8-bit field has a coded special pattern, such as 00000000. The total number of bits required for this particular format is about 132 bits, Other signal formats can also be used here, using fewer bits or more bits.

FIG. 3 is a flow chart setting forth a procedure for practice of the first embodiment of providing a communication path for sensor data. In step 31, as a mobile information source (carried by a mobile object, such as an ESW), moves within a region, N STCs, numbered n=1, ..., N (N≧3) are distributed at spaced apart locations, where STC numbers n and n+1 are spaced apart by no more than a selected distance D/K. Here, D is a maximum distance of reliable signal transmission between two STCs and K (=2, 3, 4, 5 or 6) is a small integer. The distribution of STCs can begin with number n=1 and increase to n=N, or may begin with number n=N and decrease to n=1. In step 32, STC number n is caused to transmit at least one selected information item (SII) to at least one of the STCs number n'=n−1, n−2, ..., n−K, for n=K+1, K+2, ..., N, where the information item is drawn from the set of SIIs. This (re)transmission of one or more SIIs may continue in a "daisy chain" until the SII is received by an STC that can transmit the SII(s) to a signal receiver for analysis of the received SII. In step 33, at least one of the STCs transmits the SII(s) to a signal receiver for analysis and processing of the received SII.

Second Embodiment. Location Determination

Figure 4A:
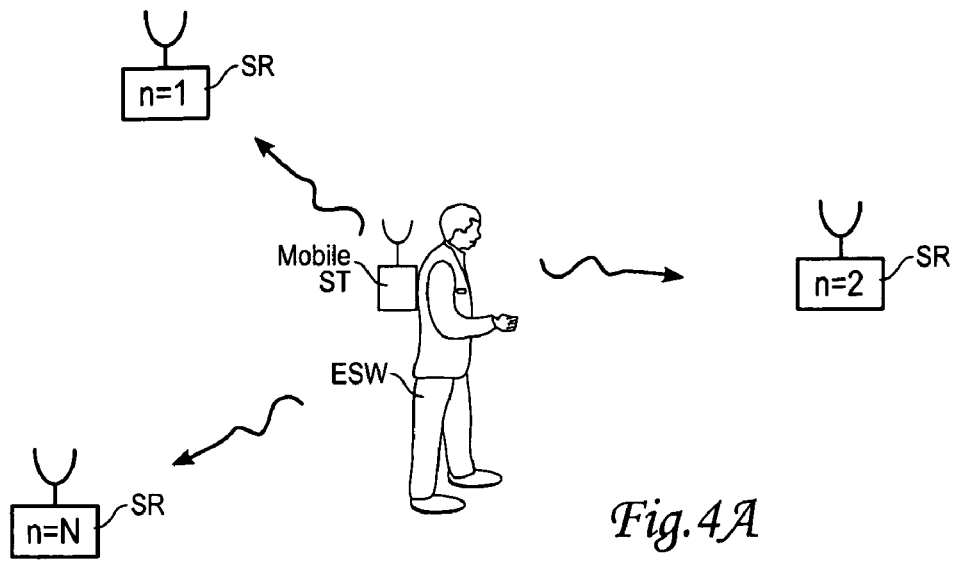
FIGS. 4A, 4B and 4C illustrated three versions of determination of signal propagation time for a second embodiment to estimate location of an object.

In a second embodiment, illustrated in FIG. 4A, a portion of a signal from a STC or from a suitable signal transmitter (collectively referred to as a "ST") is used to determine location and/or orientation of the ESW who wears or carries the source-ST is preferably determined by receipt of a separate coded signal at three, four or more signal receivers directly from the source-ST(s), operated in a second mode. This approach is presented in the Appendix. If only location of a source-ST is to be determined, this signal is received by at least three spaced apart, noncollinear signal receivers (four spaced apart non-coplanar signal receivers, if time shift at the source-ST is also to be compensated for). The location of the (mobile) ST is found by a quadratic location analysis process set forth in the Appendix. Determination of spatial orientation of an ESW (e.g., erect and vertical, or kneeling, or supine) requires use of at least three or four source-ST signal transmitters, located at spaced apart locations, no three of which are collinear (referred to as "noncollinear" locations herein) on the ESW's body, and receipt and analysis of each of these three or four signals at the signal receivers.

In this embodiment of the invention, one or more STs or STCs is used to determine the location of an ESW or other object, and three or more STs or STCs are used to determine spatial orientation of an ESW (e.g., vertical/erect, kneeling, supine) or other object. The algorithms used to determine location and to determine spatial orientation are set forth in the Appendix. In a first version of location determination, a ST is provided with a power source, and the ST emits a signal at each of a sequence of specified times, which are known, apart from a ST clock time shift $\Delta t$ or equivalent distance shift $b = c\Delta t$, which is also determinable. In this embodiment, the emitted signal is received by each of K signal receivers (collectively referred to as "SRs"), and the location coordinates of the ST are determined exactly, without iteration or approximation.

Figure 4C:
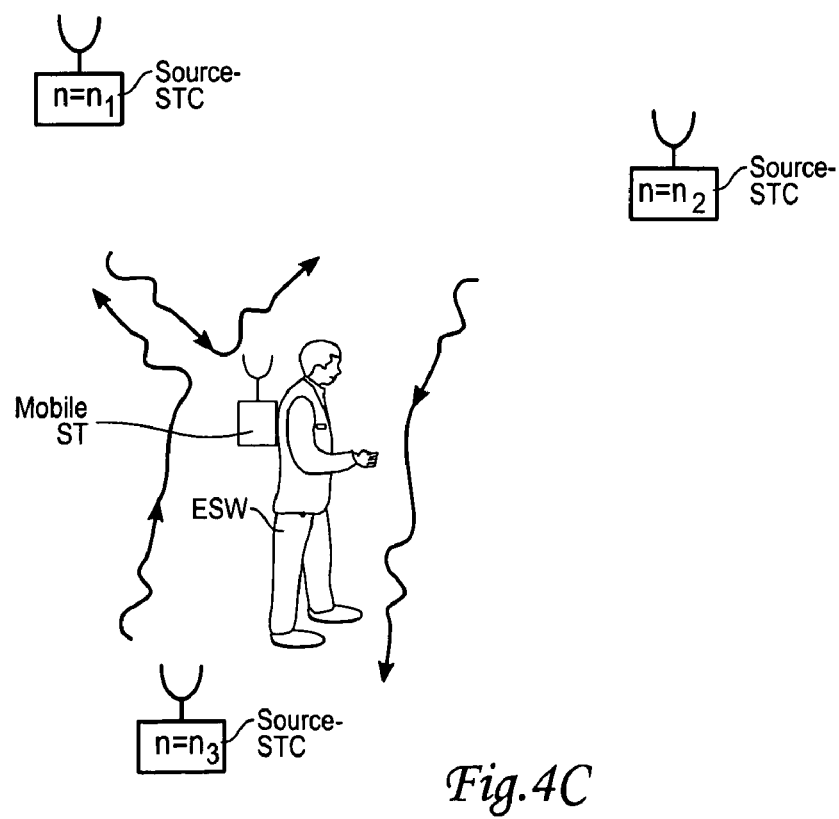
Figure 4B:
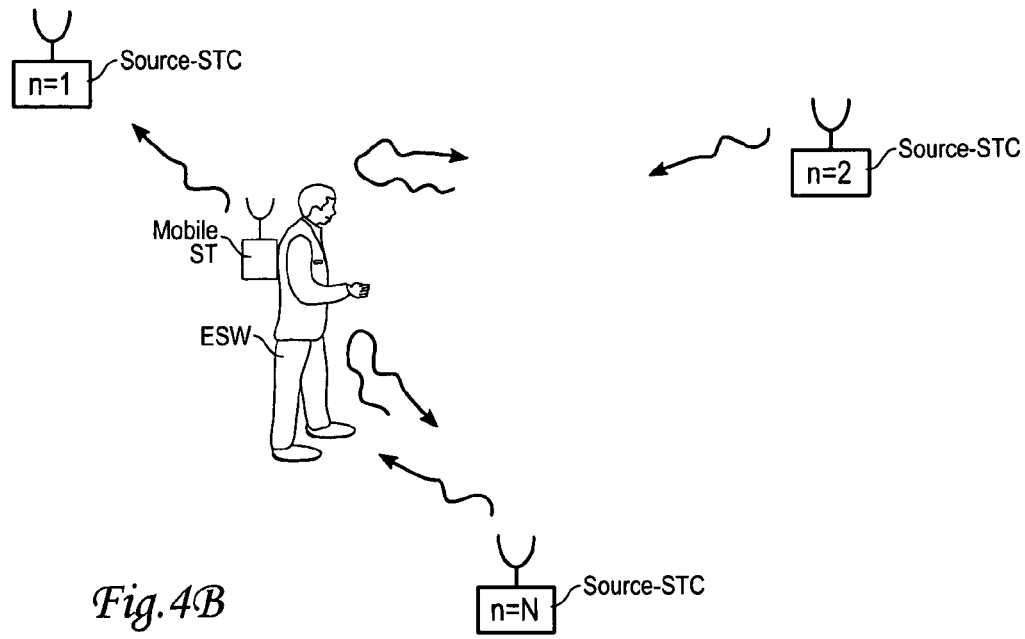

In a second version of location determination, illustrated in FIG. 4B, first, second and third distinguishable source-STC signals are initially transmitted by first, second and third spaced apart, noncollinear source-STCs, respectively. Each transmitted signal is received by a mobile STC and subjected to a selected (known) short time delay $\Delta t(n) \geq 0$ (n=1,2,3), and a response signal is transmitted to and received by the source-STC(n) that transmitted the corresponding source signal, after a time interval of length $\Delta t(n)$, which may be uniform or may be different for each source signal (n). The time interval length $\Delta t(\text{prop};n)$ for one-way signal propagation from STC number n to the mobile STC is related to the round trip time interval length $\Delta t(rt;n)$ by $$\Delta t(\text{prop};n) = \{\Delta t(rt;n) - \Delta t(n)\}/2, \tag{1}$$

and the time shift at the mobile STC is irrelevant in this version. FIG. 4B illustrates this version. The location of the mobile STC is found by a quadratic location analysis process set forth in the Appendix.

In a third version of location determination, illustrated in FIG. 4C, first, second and third source signals are initially transmitted by first, second and third spaced apart source-STCs, respectively. Each source signal (n) is received by a mobile STC and subjected to a selected (known) short time delay of length $\Delta t(n) \geq 0$, and first, second and third response signals are transmitted to and received by the respective second, third and first source-STCs. Otherwise stated, if n1, n2 and n3 are integers in the range $1 \leq n1, n2, n3 \leq N$ and no two of these integers are the same, the total time of signal propagation T(n1,r,n2) from source-STC n1 to the mobile STC to source-STC n2 is $$T(n1,r,n2) = T(n1,r) + \Delta t(n1) + T(r,n2), \tag{2}$$

where T(n1,r) and T(r,n2) are the one-way signal propagation times from source-STC n1 to the mobile STC, and from the mobile STC to source-STC n2, respectively. The time of one-way signal propagation, T(n2,r) = T(r,n2), from source-STC n2 to the mobile STC is then determined from the difference $$t(n1,r,n2) + T(n2,r,n3) - T(n3,r,n1) = 2T(n2,r) + \Delta t(n1) + \Delta t(n2) - \Delta t(n3). \tag{3}$$

The one-way signal propagation time of interest T(n2,r) is thus computed as $$T(n2,r) = \{T(n1,r,n2) + T(n2,r,n3) - T(n3,r,n1) - \Delta t(n1) - \Delta t(n2) + \Delta t(n3)\}/2, \tag{4}$$

and T(n1,r) and T(n3,r) are determined in an analogous manner. Time shift at the ST is irrelevant, as in the second version. The location of the mobile STC is found by a quadratic location analysis process set forth in the Appendix.

Figure 5A:
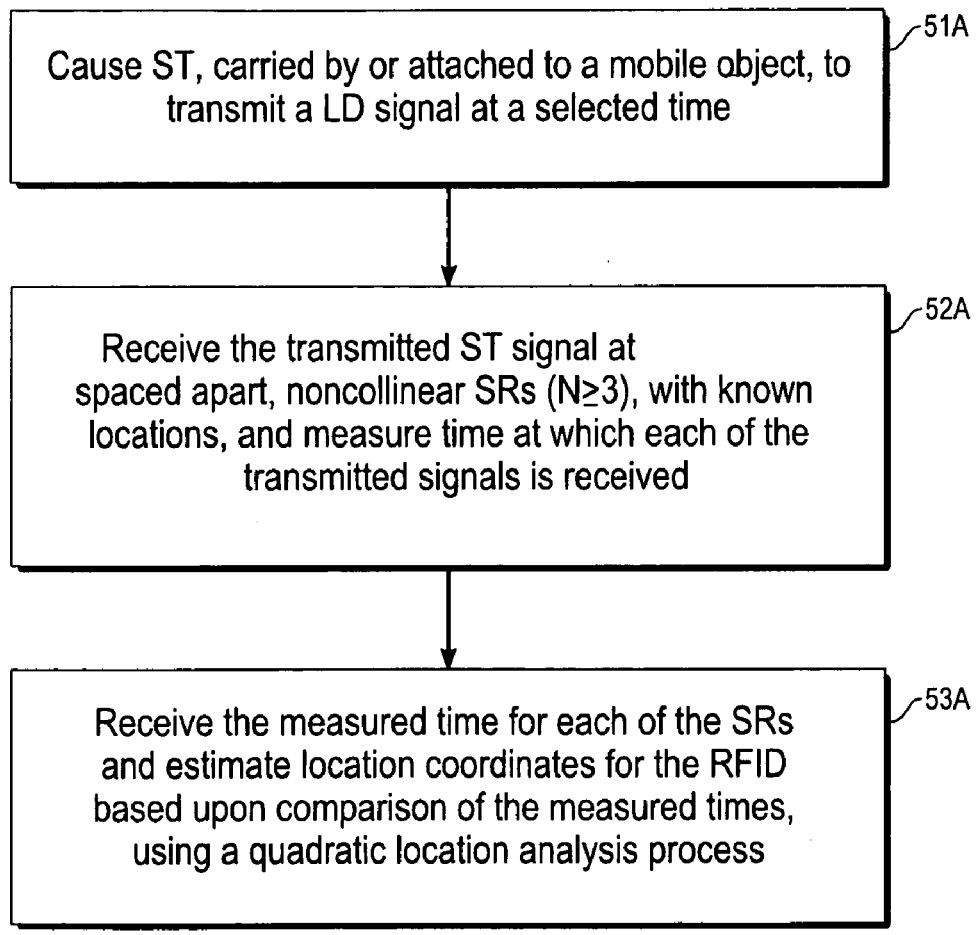
FIGS. 5A, 5B and 5C are flow charts, corresponding to the versions of signal propagation time illustrated in FIGS. 4A, 4B and 4C, for estimation of location coordinates of an object.
Figure 5B:
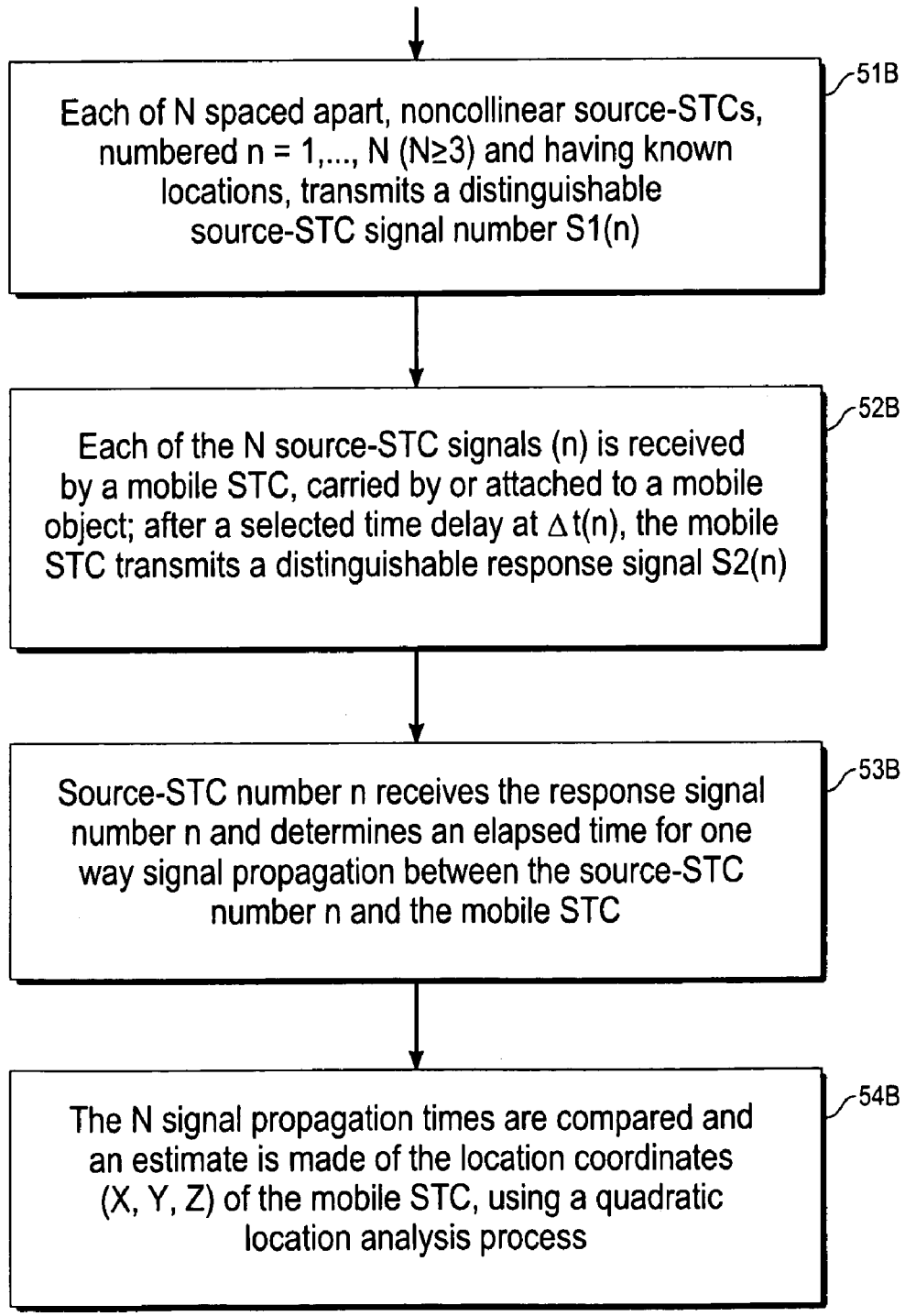
Figure 5C:
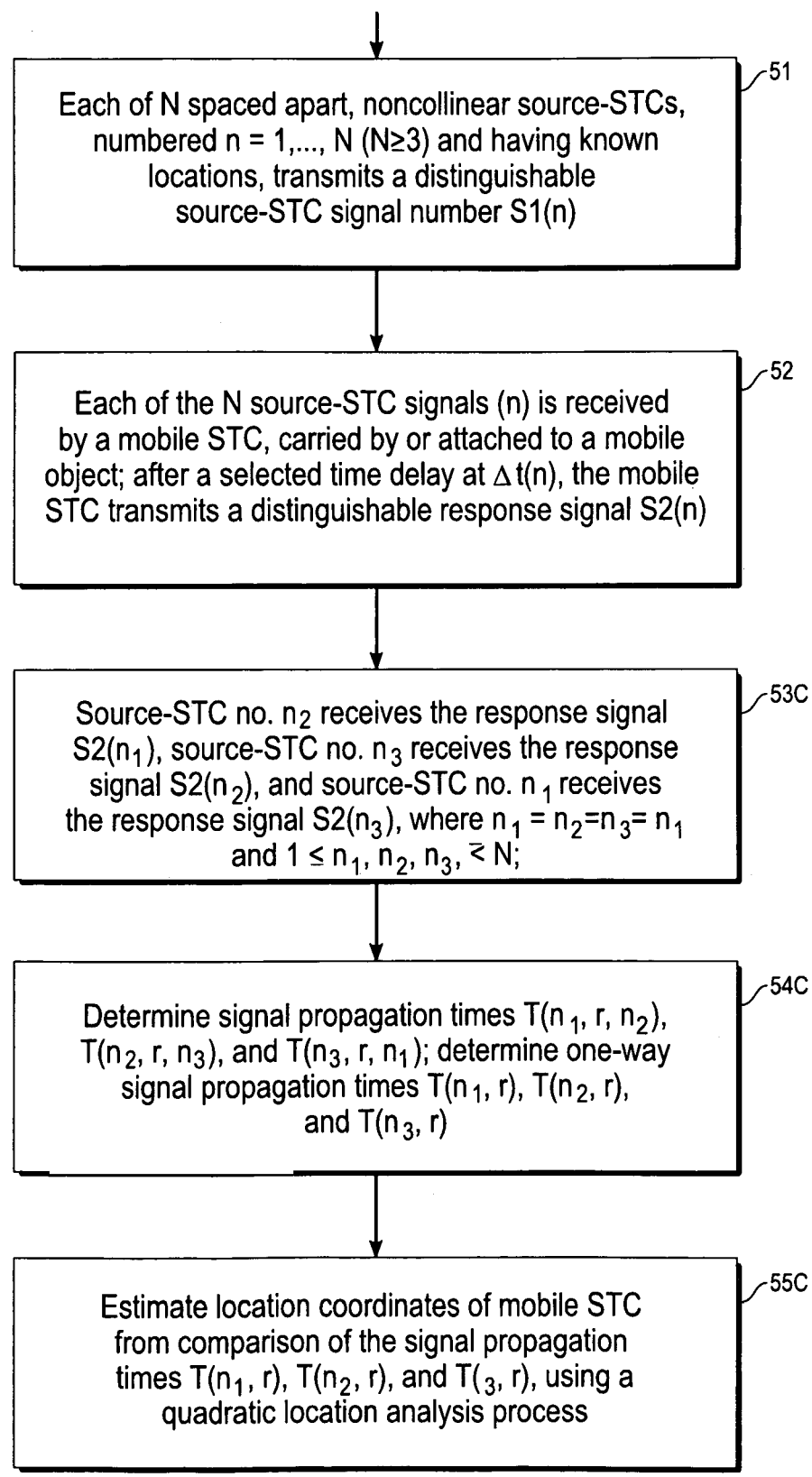

FIGS. 5A, 5B and 5C are flow charts of procedures for location determination (LD), using the first, second and third versions of determination of signal propagation time illustrated in FIGS. 4A, 4B and 4C. In step 51A in FIG. 5A, a ST, carried by or attached to a mobile object, transmits a location determination signal at a selected time. In step 52A, the transmitted ST signal is received at each of N spaced apart, noncollinear RFIDs or other SRs, numbered 1, 2, ..., N (N≦3) and having known locations, and a time at which the ST signal is received at each SR is measured and used to determine a one-way signal propagation time from the ST to each SR (n). In step 53A, these N measured times are compared and location coordinates (x,y,z) of the mobile ST at the selected time are estimated, using a quadratic location analysis process, as set forth in the Appendix.

In FIG. 5B, in step 51B, each of N spaced apart, noncollinear source-STCs (N≧3), numbered n=1, 2, ..., N and having known locations, transmits a distinguishable source- STC signal, number n. In step 52B, each of these source-STC signals (n) is received by a mobile STC that is attached to or carried by a mobile object, and after a selected time delay $\Delta t(n) \leq 0$, the mobile STC transmits a distinguishable response signal, number n. In step 53B, source-STC number n receives the response signal number n and determines a time of one-way signal propagation between the source-STC number n and the mobile STC, as in Eq. (1). In step 54B, these N signal propagation times are compared and an estimate is made of the location coordinates (x,y,z) of the mobile STC, using a quadratic location analytic process, as set forth in the Appendix.

In FIG. 5C, in step 51C, each of N spaced apart, noncollinear source-STCs, numbered n=1, 2, ..., N (N≦3) and having known locations, transmits a distinguishable source-STC signal, number n. In step 52C, each of these source-STC signals (n) is received by a mobile STC that is attached to or carried by a mobile object, and after a selected time delay $\Delta t(n)$, the mobile STC transmits a distinguishable response signal (n). In step 53C, response signals number n1, n2 and n3 are received at source transceivers number n2, n3 and n1, respectively, where n1, n2 and n3 are integers satisfying n1≠n2≠n3≠n1 and 1≦n1, n2, n3≦N, and times of propagation, T(n1,r,n2), T(n2,r,n3) and T(n3,r,n1), are determined from source-STC n1 to the mobile-STC to source-STC n2, from source-STC n2 to the mobile-STC to source transceiver n3, and from sourc-STC n3 to the mobile-STC to source-STC n1, respectively. In step 54C, elapsed times for one-way signal propagation, T(n1,r,n2), T(n2,r,n3) and T(n3,r,n1) between the respective source-STCs n1, n2 and n3 and the mobile transceiver are determined, as in Eqs. (2), (3) and (4). In step 55C, location coordinates of the mobile STC are estimated, based upon a comparison of the one-way signal propagation times T(n1,r), T(n2,r) and T(n3,r), using a quadratic location analysis process, as set forth in the Appendix.

Provision of LD signal sources and determination of their (known) locations outside a structure is not usually a problem, although a small time interval (e.g., several minutes) may be required for this task. Provision of LD signal sources with known locations inside a structure may be implemented by placing these sources at structure entrances and exits, where the coordinates of such a location can be determined using "outside" LD sources as a first step.

Figure 6:
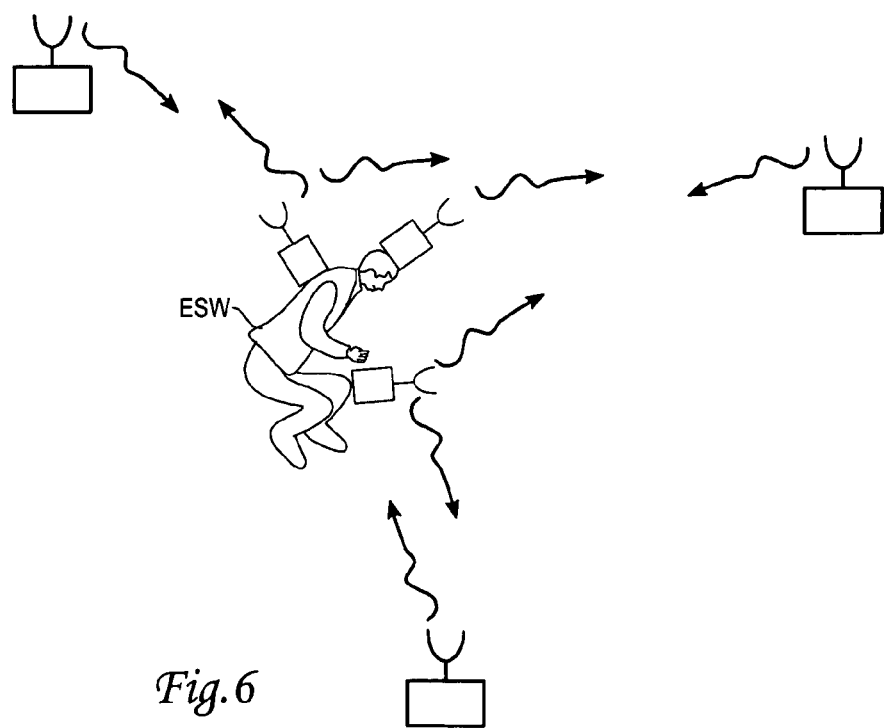
FIG. 6 illustrates estimation of spatial orientation of an object.

Third Embodiment. Spatial Orientation Determination

Where spatial orientation of an object, such as an ESW or an appliance used in responding to the emergency, is to be determined, three or more spaced apart, noncollinear STCs are positioned on the object, and the location of each STC is determined, for example by the first version or the second version or the third version discussed in the preceding three paragraphs. Geometric analysis is then used to determine a plane defined by three or more STC locations and to determine the spatial orientation of the object, as discussed in the Appendix and illustrated in FIG. 6.

Figure 7:
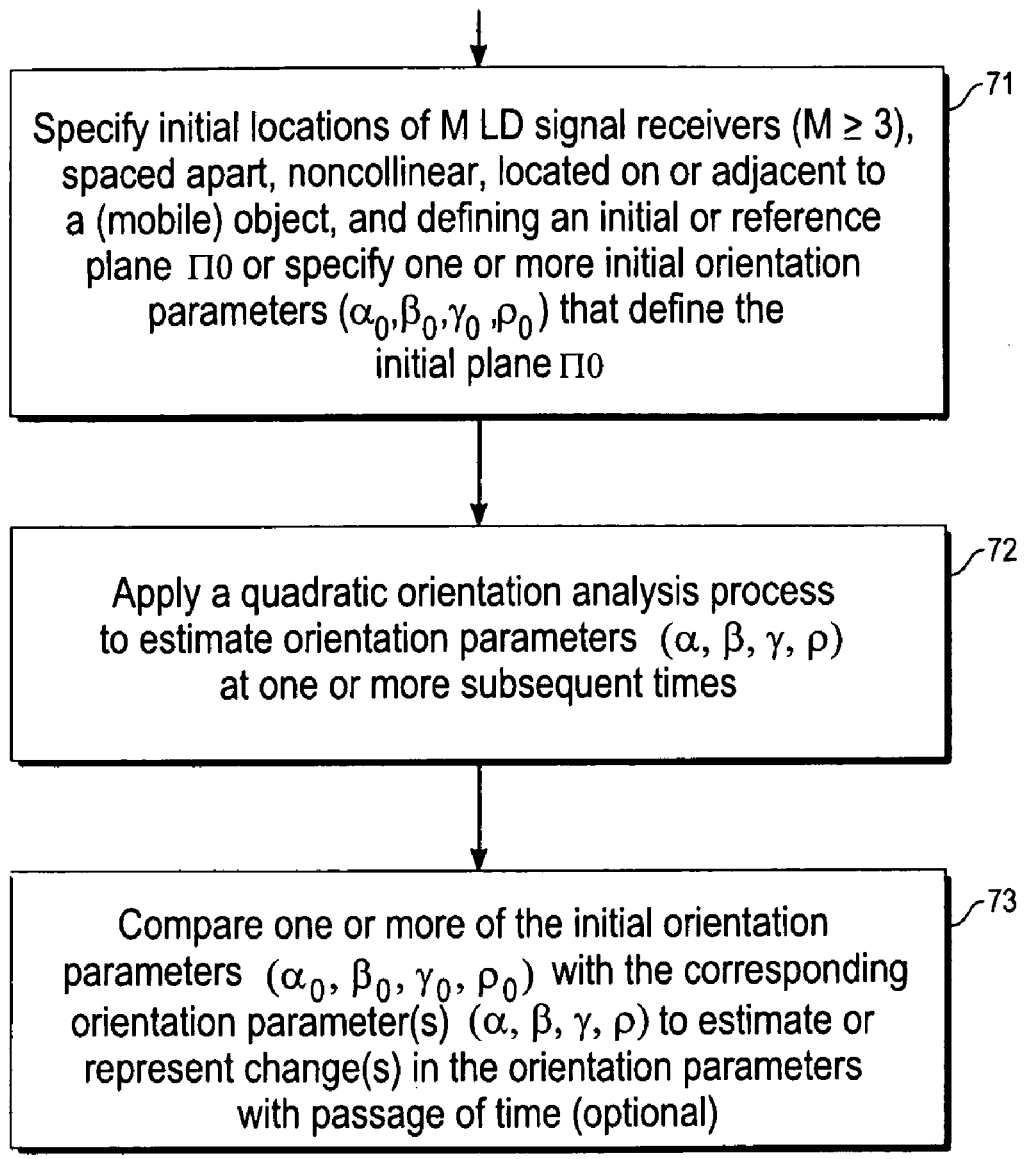
FIG. 7 is a flow chart of a procedure for estimation of spatial orientation of an object.

FIG. 7 is a flow chart of a procedure for estimating spatial orientation of a mobile object. In step 71, the system specifies an initial or reference plane Π0 whose spatial orientation is to be monitored, for example, by specifying: (1) initial or reference locations or location coordinates of M STs or STCs (M≦3), spaced apart, noncollinear, located on or adjacent to the object, and defining the plane Π0; or (2) one or more initial or reference direction cosines and/or a displacement distance ($\alpha 0, \beta 0, \gamma 0, p0$) (referred to collectively as the "initial orientation parameters") that also define the initial or reference plane, as discussed in the Appendix. In step 72, the system applies a "quadratic orientation analysis process," as set forth in the Appendix, to estimate the orientation parameters ($\alpha, \beta, \gamma, p$) at one or more subsequent times. In step 73, the system optionally compares one or more of the initial orientation parameters ($\alpha, \beta 0, \gamma 0, p0$) with corresponding parameters among the subsequent orientation parameter(s) ($\alpha, \beta, \gamma, p$), in order to estimate or represent change(s) in the orientation parameters, for example with passage of time.

Fourth Embodiment. Indication of Escape Route

Figure 8:
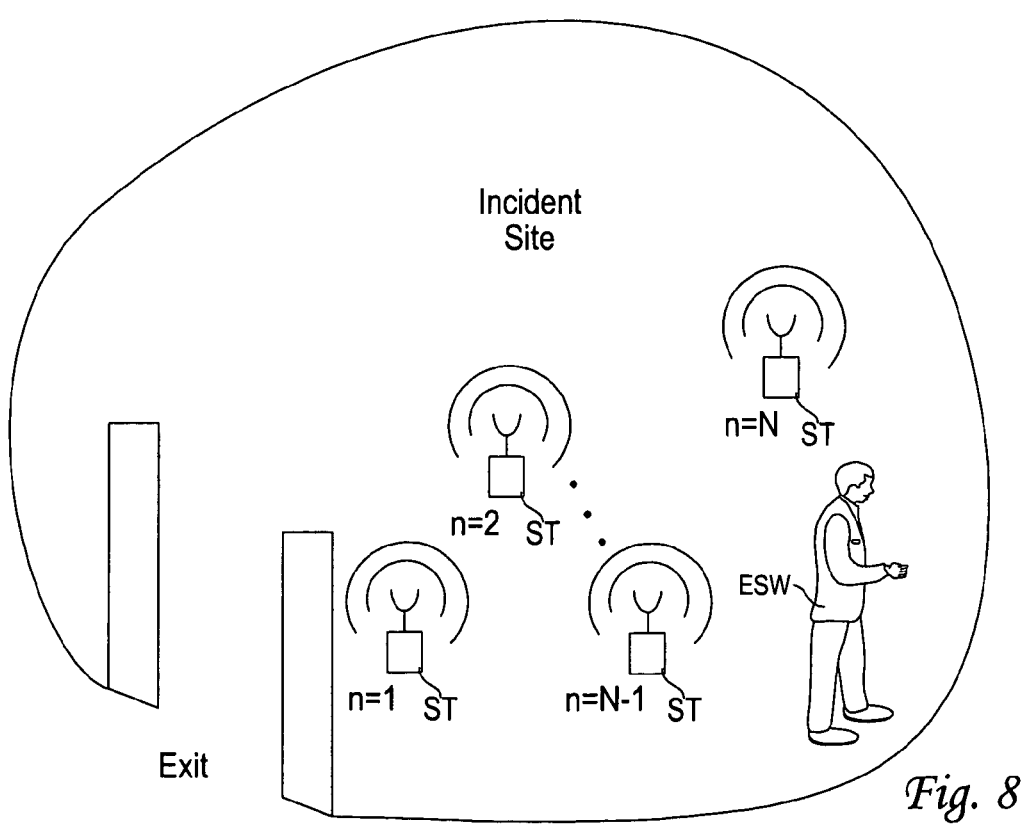
FIG. 8 illustrates use of a sequence of RFIDs to indicate a path toward an exit.

In a fourth embodiment, a sequence of STs, located approximately according to a plan, can serve as an escape route for an ESW who is attempting to exit from an incident site that is part of an extreme environment. Each of the sequence of STs is switched to a third mode of operation, whereby each ST emits a distinguishable, visibly and/or audibly perceptible signal at each of a sequence of selected times, as illustrated in FIG. 8. The signal emission times for two adjacent STs are spaced apart by a selected time interval of length at least $\Delta t(min) \approx 0.2$–2 sec, or longer if desired, so that visual or audible confusion is avoided. Here, the ESW relies upon his/her own sense of hearing and/or sight to identify and follow the escape route.

Where audible signals are used, each of the sequence of STs emits a signal having a separate, audibly distinguishable frequency. In one version, the sequence of signal frequencies is monotonically increasing as the ST sequence number n (=1, ..., N) decreases and the ST path or direction leads the ESW away from the incident site toward an exit and/or relative safety. In a second version, the sequence of signal frequencies is monotonically decreasing as the ST sequence number n (=1, ..., N) decreases.

Where visual signals are used, the wavelengths emitted by the separate STs should be visually distinguishable, which will limit the number of wavelengths used to no more than about five. In one version, three visually distinguishable wavelengths, red, green and blue, are used in a repeating pattern for the signals emitted by the sequence of STs: red, green, blue, red, green, blue, red, green, ..., as the ST no. decreases and the ST path or direction leads the ESW away from the incident site toward an exit and/or relative safety.

Figure 9:
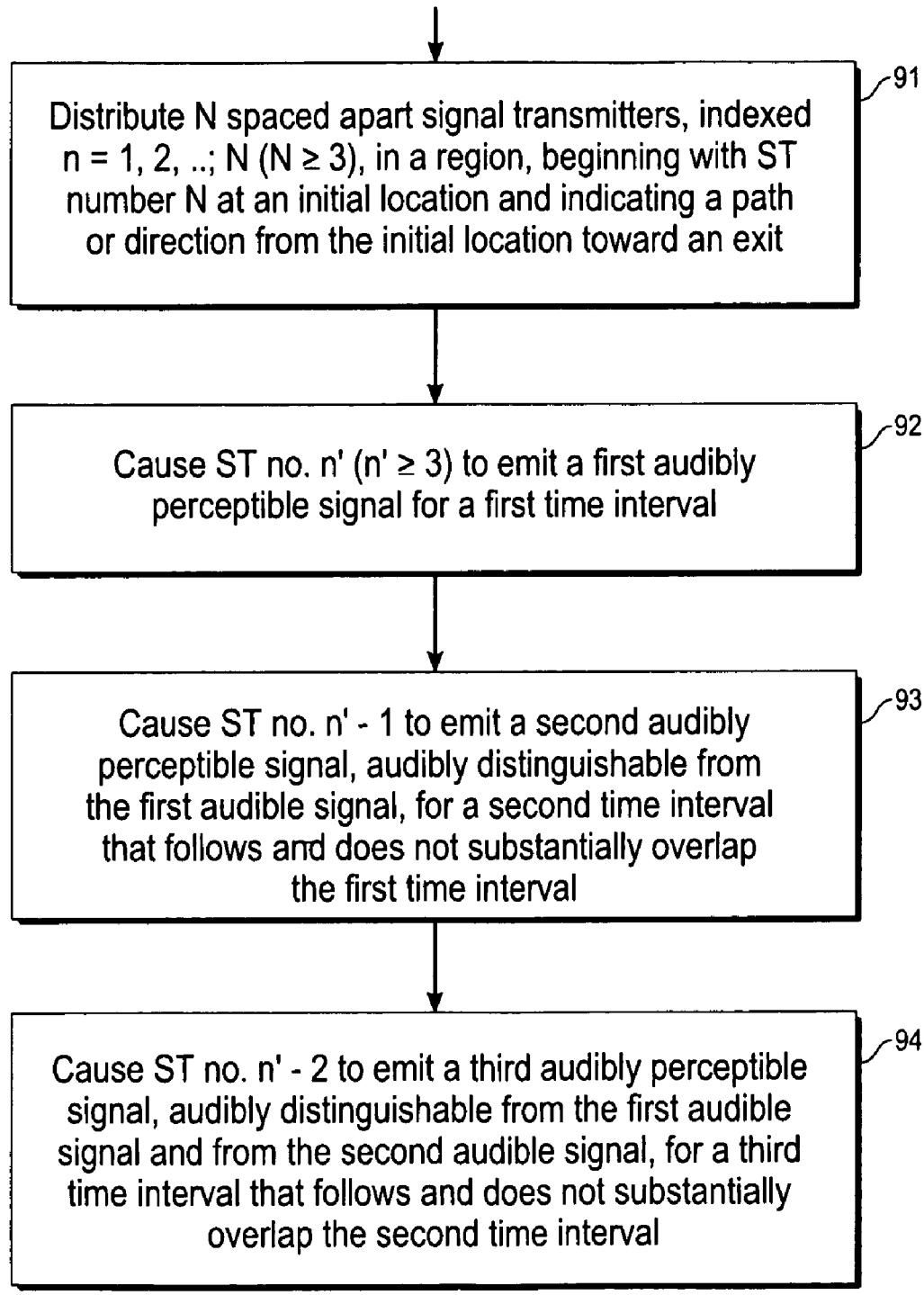
FIGS. 9 and 10 are flow charts of procedures for indicating a path toward an exit, as illustrated in FIG. 8.

FIG. 9 is a flow chart of a procedure for practicing the fourth embodiment. In step 91, N spaced apart STs, indexed n=1, , N (N≦3) are distributed in a region, beginning with ST number N at an initial location and indicating a path or direction from the initial location n in the general direction of the exit. In step 92, ST no. n' (n'≦3) is caused to emit a first audibly perceptible signal for a first time interval. In step 93, ST no. n'-1 is caused to emit a second audibly perceptible signal, audibly distinguishable from the first audible signal, for a second time interval that follows and does not substantially overlap the first time interval. In step 94, ST no. n'-2 is caused to emit a third audibly perceptible signal, audibly distinguishable from the first audible signal and from the second audible signal, for a third time interval that follows and does not substantially overlap the second time interval.

Figure 10:
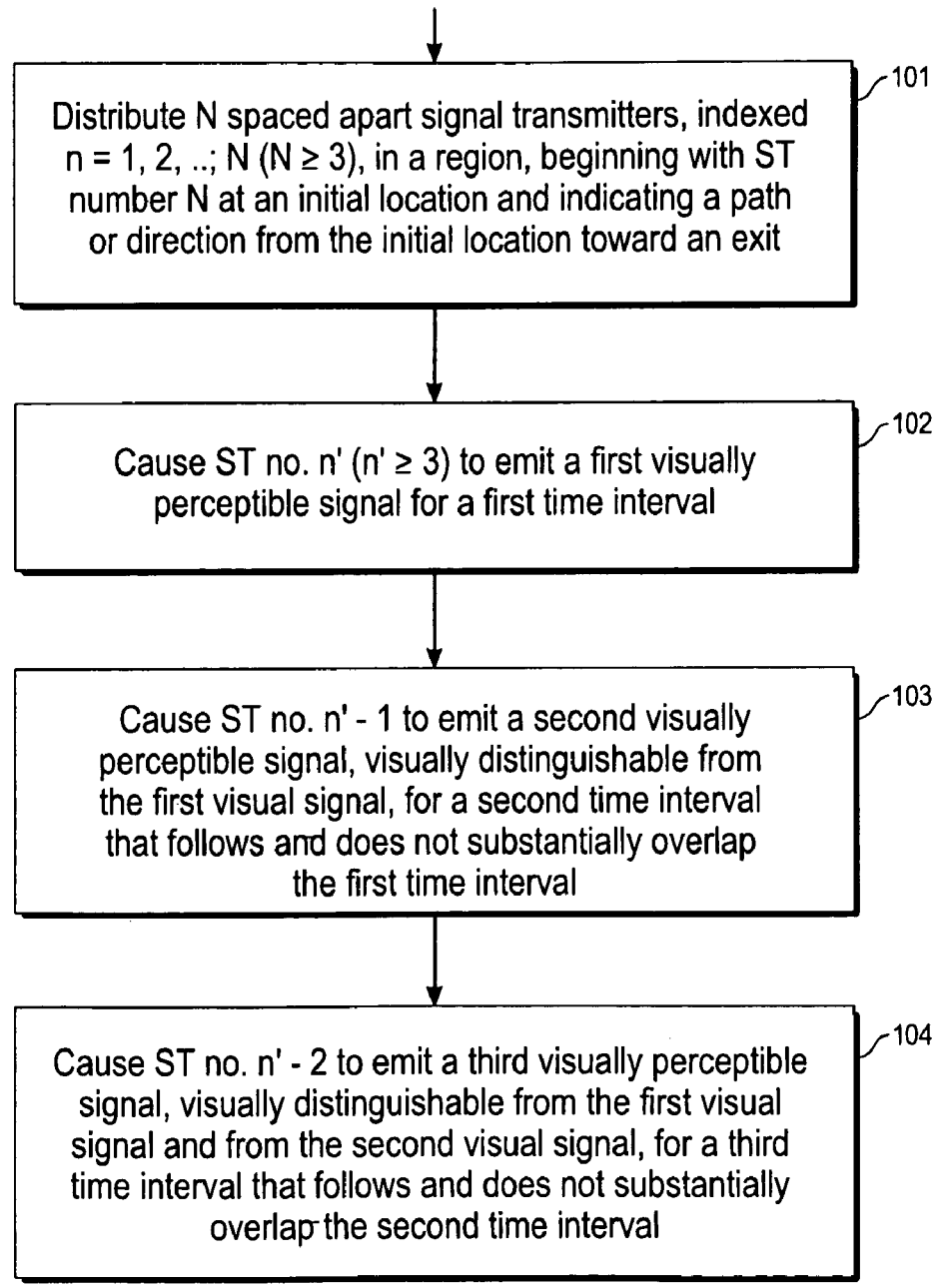

FIG. 10 is a flow chart of another procedure for practicing the fourth embodiment. In step 101, N spaced apart STs, indexed n=1, ..., N (N≦13) are distributed in a region, beginning with ST number N at an initial location and indicating a path or direction from the initial location in the general direction of the exit. In step 102, ST no. n' (n'≦3) is caused to emit a first visually perceptible signal for a first time interval. In step 103, ST no. n'-1 is caused to emit a second visually perceptible signal, visually distinguishable from the first visual signal, for a second time interval that follows and does not substantially overlap the first time interval. In step 104, ST no. n'-2 is caused to emit a third visually perceptible signal, visually distinguishable from the first visual signal and from the second visual signal, for a third time interval that follows and does not substantially overlap the second time interval.

Fifth Embodiment. Location of Emergency Service Appliance

Figure 11:
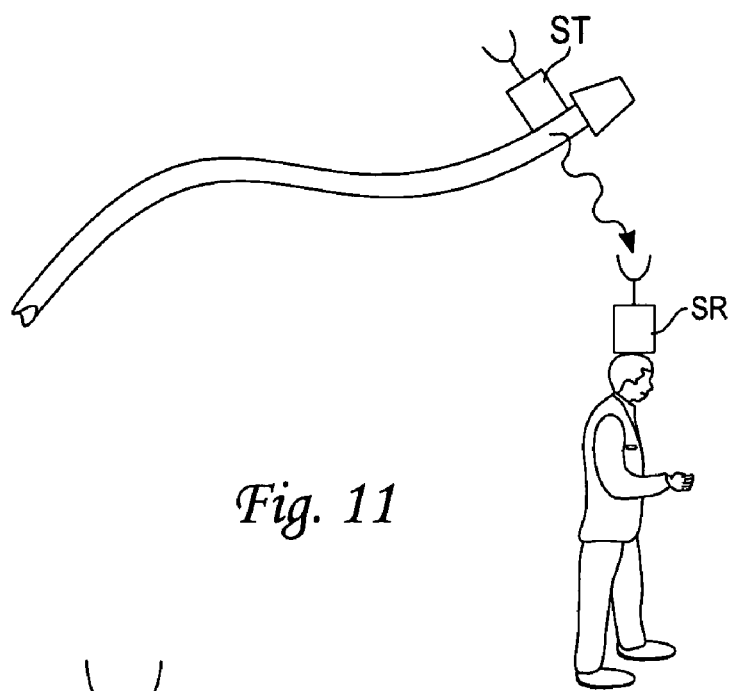
FIGS. 11, 12 and 13 illustrates use of an angular orientation RFID to indicate a direction to a firefighting appliance, such as a fire hose.
Figure 13:
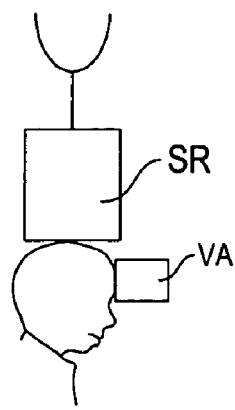
Figure 12:
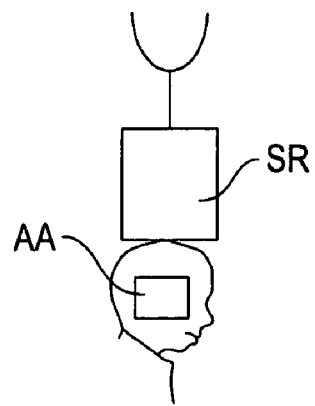

In a fifth embodiment, applicable to a fire fighting (FF) mode or similar emergency services ("ES") mode, one or more STs is attached to a selected location(s) on an ES appliance, and a SR is attached to or worn by or carried by an ESW, such as a fire fighter. The SR is configured to receive a signal from the ST and to emit an audibly perceptible or visually perceptible orientation signal having a signal indicia (intensity, frequency, wavelength, etc.) that varies monotonically or strictly monotonically with a perceived angle θ between a direction of receipt of the transmitted signal at the SR and a selected or preferred direction D, as illustrated in FIG. 11. This selected direction D is preferably the direction an ESW would face when looking straight ahead. The signal indicia preferably has a low enough magnitude that only the wearer of the SR and others within a small distance (e.g., d=30-90 cm) will perceive the orientation signal. The audible orientation signal may, for example, be emitted by an audible appliance AA similar to a hearing aid and worn adjacent to the ESW's ear, as illustrated in FIG. 12. The visual orientation signal may, for example, be a light emitting diode or other visual appliance VA worn adjacent to, but not directly in front of the ESW's eye, as illustrated in FIG. 13. This embodiment allows an ESW who cannot see an ES appliance, such as a fire hose, to identify a direction of approach to the appliance and to move toward the ES appliance, without requiring that the ESW be able to "see" the ES appliance itself. This embodiment can be used, for example, to guide a fire fighter toward safety. Here again, the ESW relies upon his/her own sense of hearing and/or sight to identify a direction of approach to the ES appliance.

Figure 14:
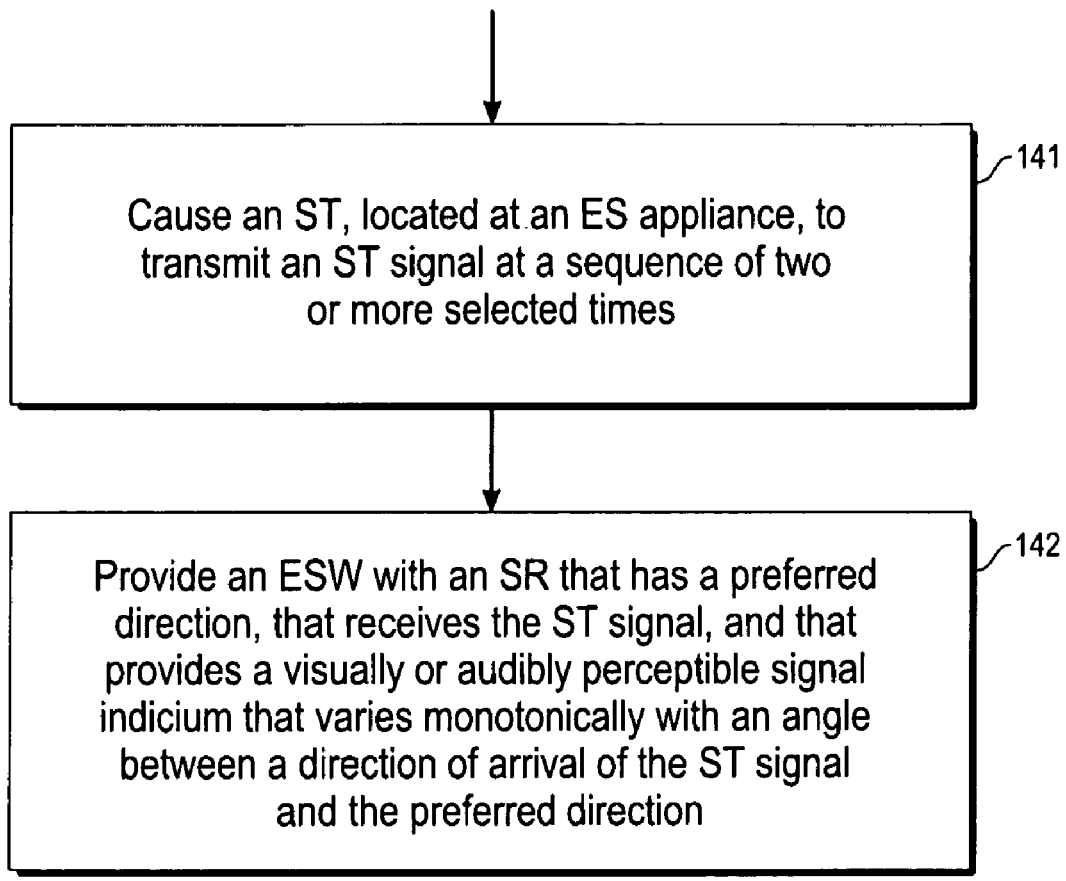
FIG. 14 is a flow chart of a procedure for practicing the fifth embodiment.

FIG. 14 is a flow chart of a procedure for practicing the fifth embodiment, where a direction toward an ES appliance is to be indicated. In step 141, an ST is provided at an ES appliance and is caused to transmit an ST signal at a sequence of two or more selected times. In step 142, an emergency services worker ("ESW") is provided with an SR that has a preferred direction and that receives the ST signal and provides an audibly perceptible or visually perceptible orientation signal having a signal indicium that varies monotonically with an angle between a direction of arrival of the ST signal and the preferred direction.

Sixth Embodiment. Information Source for Region

Figure 15:
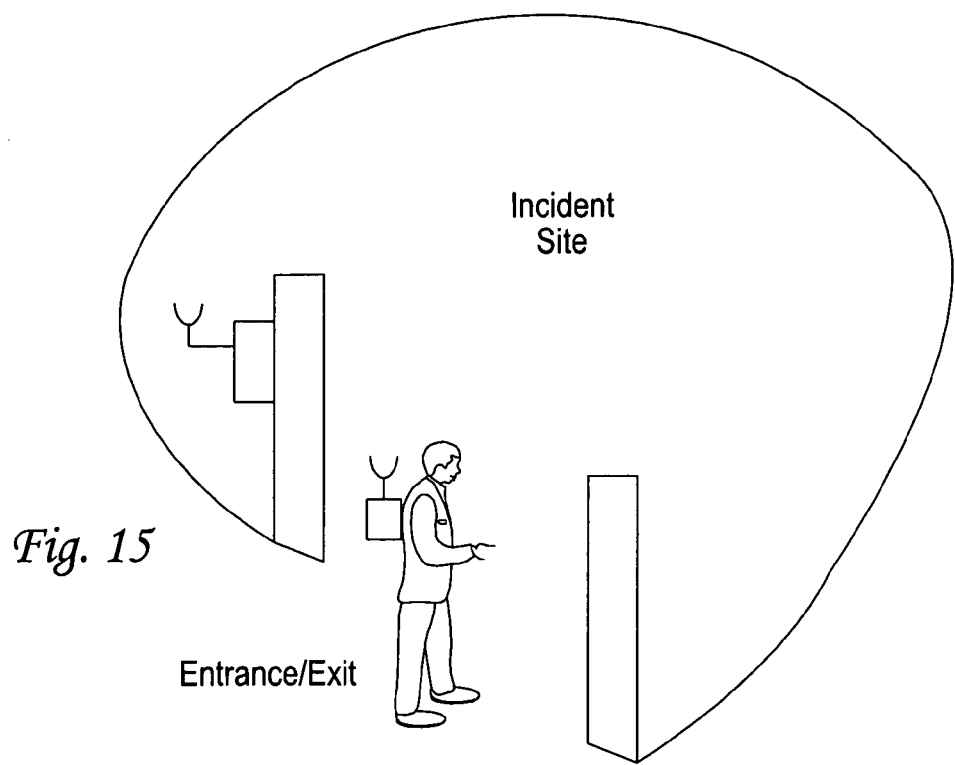
FIG. 15 illustrates use of an interrogatable RFID, positioned near an entrance to an incident site, to provide present information about the site.

A sixth embodiment is an interrogatable SR that is positioned at or near an entrance to a region in or adjacent to a structure that may present an extreme environment (fire toxic fumes or fluids, chemical or biological hazard, mechanical collapse, explosion hazard, nuclear hazard, etc.), as illustrated in FIG. 15. Information concerning the most recent inspection of the region or associated structure and/or contents stored in the region or structure is downloaded into, or transmitted to, the SR for subsequent readout. These region information items ("RIIs") include one or more of: date and time the information was last prepared or modified; presence or absence of at least one fluid or solid substance that can present a toxic, reactive ignitable or corrosive substance, presence or absence of at least one fluid or solid substance that can present a chemical hazard, presence or absence of at least one fluid or solid substance that can present a biological hazard, presence or absence of at least one fluid or solid substance that can present an explosion hazard, presence or absence of at least one fluid or solid substance that can present a nuclear hazard, presence or absence of any structural condition that may cause or contribute to a structural collapse; and remedial action, if any, taken in response to a condition associated with the region or structure.

An ESW approaching the entrance of this region will first pause and interrogate the SR and will receive a visually perceptible and/or audibly perceptible readout of relevant information on the most recent known condition of the region and/or structure and the date this information was collected and/or downloaded. The most recent relevant RII can be dated and downloaded to the SR from a central site or from a portable download unit that is positioned adjacent to the SR, optionally requiring use of a confidential code for access to the SR. Information contained in the SR can also be used as a most recent certification of the region and/or structure, for purposes of health and/or safety. This embodiment is useful for providing, at a site entrance, the most recent information concerning an inspection performed, date and time of inspection, result(s) of the inspection and remedial action, if any, taken.

Figure 16:
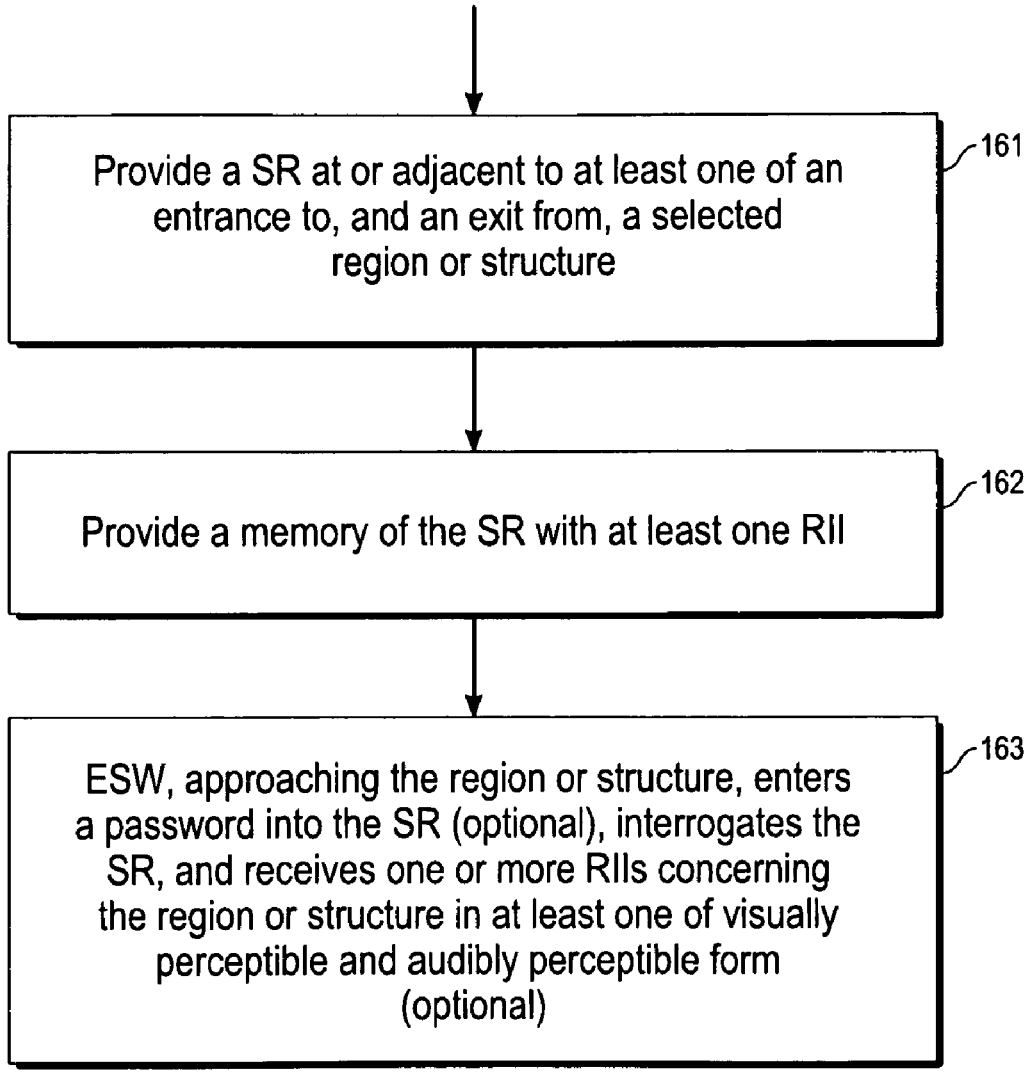
FIG. 16 is a flow chart of a procedure for practicing the sixth embodiment.

FIG. 16 is a flow chart of a procedure for practicing the sixth embodiment, providing information on a region and/or structure associated with the region. In step 161, an interrogatable SR is provided at or adjacent to at least one of an entrance to and an exit from a selected region or structure. In step 162, a memory of the SR is provided with at least one of the region information items ("RIIs") contained in the memory. In step 163 (optional), an emergency services worker ("ESW") approaching the entrance or exit of the region, enters a confidential password (optional) into the SR, interrogates the SR and receives one or more RIIs concerning the region and/or structure in at least one of visually perceptible and audibly perceptible form. The RII may be encoded and/or encrypted so that only an ESW who is pre-cleared or approved has access to the RII. Alternatively, an ESW may have access to some of the RIIs and not to other RIIs, based upon need to know and/or a job description for the ESW and/or entry of a password.

For example, a portion or all of the SR information may have an associated first indicium (e.g., an ordered string of binary numbers or other alphanumeric characters); and the ESW may (or may not) present a second indicium that is to initially compared with the first indicium. If the ESW does not present a second indicium, or if the ESW present a second indicium that does not "correspond" to the first indicium, the SR system denies access to the ESW and does not provide information from the SR memory that the ESW requests or expects. If the ESW provides a second indicium that "corresponds" to the first indicium, the SR system may provide the information sought. A second indicium may "correspond" to the first indicium if (i) all or a substantial portion of the second indicium agrees, character by character, with the first indicium or (ii) a character by character sum of the first indicium and the second indicium is equal to a specified character by character sum; the second indicium is then said to be S-complementary to the first indicium. For example, if the first indicium and the second indicium are binary complements (character by character) of each other, the sum S may be a string of zeroes or a string one ones.

Seventh Embodiment. Thermal Sensor Transmitter

A seventh embodiment is a thermal sensor RFID or other thermal sensor transmitter (collectively referred to as a "TST") that is positioned within a region or structure that may present an extreme environment. In a first version, the TST is configured to sense the local temperature within the region and to provide a thermal load signal representing a time-integral of (accumulated) temperature T above a selected temperature threshold:

$$TL(t) = \int_{t0}^{t} \{H\{T(t')-T(\text{thr})\}\}^p dt', \quad (5)$$

where t0 is a selected time value, $H\{x\}=x$ ($x>0$) and $H\{x\}=0$ ($x\leq 0$), T(thr) is a selected temperature at which thermal breakdown of an object in the region or structure may occur, and p is a selected positive exponent. For local temperatures T(t') that exceed T(thr), the measured quantity TL(t) increases, and the TST records and displays this quantity to indicate, to an ESW, the relative danger of a fire burst occurring in the region. If TL(t) equals or exceeds a thermal load threshold TL(thr) at which thermal breakdown of the region or structure may occur, an ESW may be advised or required to exit from or to avoid this region, for example, by issuance of a visual and/or audible warning signal.

Figure 17:
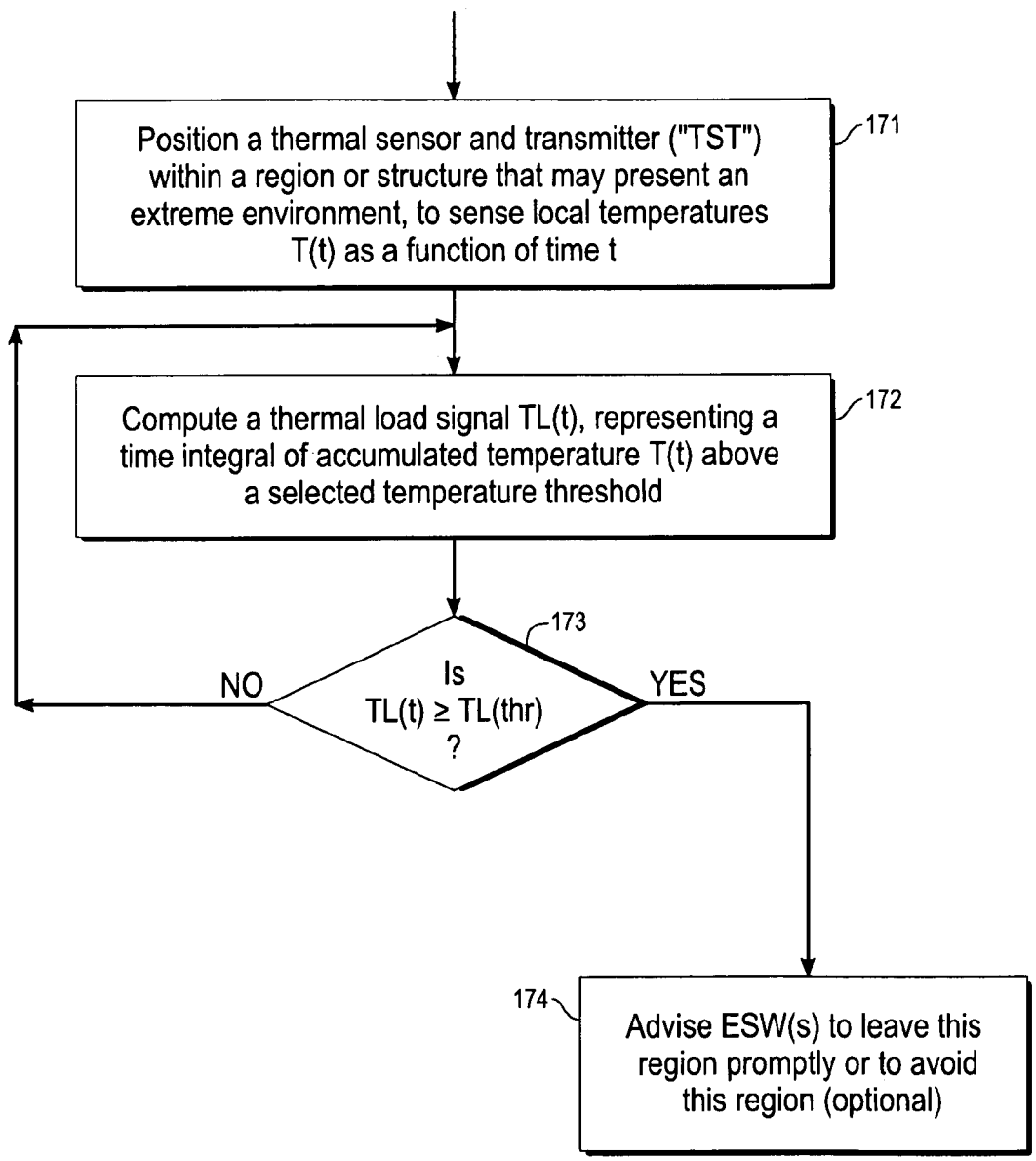
FIGS. 17 and 19 are flow charts of procedures for practicing the seventh and eighth embodiments

FIG. 17 is a flow chart of a procedure for practicing the seventh embodiment, wherein an accumulated temperature above a threshold is computed and monitored to indicate when a danger point is being approached. In step 171, a TST is placed within a region or structure and activated. In step 172, the TST computes the accumulated thermal load TL(t), as in Eq. (5). In step 173, the system determines if TL(t) is greater than or equal to a threshold value TL(thr). If the answer to the query in step 173 is "no," the system returns to step 172. If the answer to the query in step 173 is "yes," the system moves to step 174 (optional) and promptly advises an ESW to exit from, or to avoid, this region.

Eighth Embodiment. Thermal Breakdown Transmitter

Figure 18:
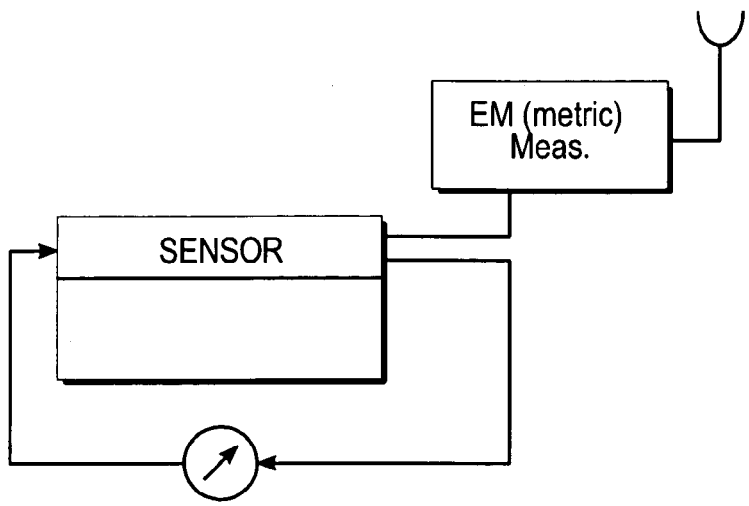
FIGS. 18 illustrates use of a thermal sensor RFID to provide a measure of high temperature exposure at an incident site.

An eighth embodiment, an alternative to the seventh embodiment, provides a sacrificial sensor-transmitter RFID or other sacrificial sensor-transmitter (collectively referred to as a "SST") having a sacrificial pyrolytic layer or similar sensor layer that has a known melting or dissociation temperature T(diss) and is configured to pass a small electrical current I(t) through the pyrolytic layer, as illustrated in FIG. 18. As the local temperature approaches T(diss) from below, a measured value of electrical resistance or magnetic permeability (collectively referred to as an "EM(metric)") of the pyrolytic material begins to differ substantially from its normal value at a much lower temperature:

$$|EM(\text{metric})-EM(\text{metric;normal})|=\Delta EM > \Delta EM(\text{thr}). \quad (6)$$

When this measured difference exceeds a selected threshold value ΔEM(thr), the SST is programmed to emit an audibly perceptible and/or visually perceptible warning signal, advising an ESW to exit from or to avoid this region.

Figure 19:
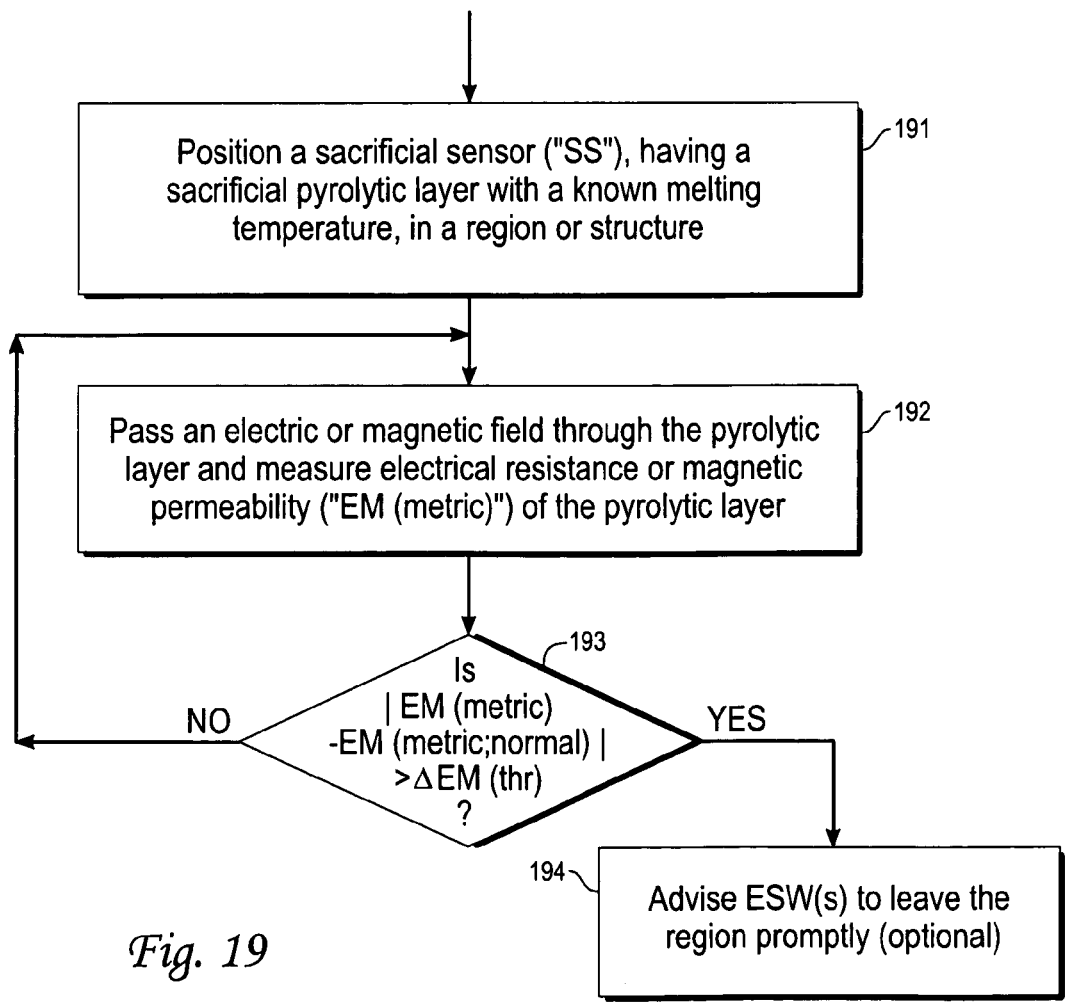

FIG. 19 is a flow chart for practicing the eighth embodiment, wherein wherein an accumulated temperature above a threshold is computed and monitored to indicate when a danger point is being approached. In step 191, a SST, having a sacrificial pyrolytic layer, is placed within a region or structure and activated. In step 192, the SST begins to measure at least one of electrical resistance and magnetic permeability ("EM(metric)"), associated with a current passing through the pyrolytic layer. In step 193, the system determines if the difference ΔEM is greater than a selected threshold difference ΔEM(thr). If the answer to the query in step 193 is "no," the system returns to step 192. If the answer to the query in step 193 is "yes," the system moves to step 194 (optional) and promptly advises an ESW to exit from, or to avoid, this region.

Each of the eight embodiments, and corresponding mode of operation, is preferably, but not necessarily, provided by a separate group of signal generators and processors SPs (STCs, STs, SRs, SSTs, TSTs, etc.) fabricated to provide the signals and/or timing required to implement that embodiment. Optionally, a group of SPs can operate in two or more modes. However, the complexity increases, and the drain on SP power source may be unacceptable. It is probably preferable to provide several separately fabricated groups of RFIDs, with each group fabricated to provide specialized services.

Glossary

AA=audio appliance
EM(metric)=electric field or magnetic field parameter value
ES=emergency service
ESW=emergency service worker
RFID=radio frequency identification device
RII=regional information item
SII=sensor information item
SR=signal receiver
SST=sacrificial sensor transmitter
ST=signal transmitter
STC=signal transceiver
TST=thermal sensor transmitter
VA=visual appliance Appendix 1

Development of Location Relations

Consider a location determination (LD) system having at least three spaced apart signal receivers 11-k (k=1, ..., K (K≤4) in FIG. 1, each capable of receiving a signal transmitted by a signal source 13 and of determining the time an location determination ("LD") signal is received, preferably with an associated inaccuracy no more than about one nanosecond (nsec). The signal receivers 11-k have known locations $(x_k, y_k, z_k)$, preferably but not necessarily fixed, in a Cartesian coordinate system, and the source 13 is mobile and has unknown coordinates (x,y,z) that may vary slowly with time t. Assuming that the LD signal is transmitted by the source 13 at a known or determinable time, t=t0, and propagates with velocity c in the ambient medium (assumed isotropic), the defining equations for determining the coordinates (x,y,z) at a given time t become $$\{(x-x_k)^2+(y-y_k)^2+(z-z_k)^2\}^{1/2}=c\cdot\Delta t_k-b, \quad (1)$$

$$\Delta t_k = t_k - t0, \quad (2)$$

$$b = c\tau, \quad (3)$$

where $t_k$ is the time the transmitted LD signal is received by the receiver no. k and τ is a time shift (unknown, but determinable) at the source that is to be compensated.

By squaring Eq. (1) for index j and for index k and subtracting these two relations from each other, one obtains a sequence of K-1 independent relations $$2x(x_k-x_j)+2y(y_k-y_j)+2z(z_k-z_j)+\{(x_k^2-x_j^2)+(y_k^2-y_j^2)+(z_k^2-z_j^2)\}=c^2 \cdot (\Delta t_k^2-\Delta t_j^2)-2b \cdot c \Delta t_{jk},\quad (4)$$

$$\Delta t_{jk}=\Delta t_j-\Delta t_k=t_j-t_k. \quad (5)$$

Equations (4) may be expressed as K-1 linear independent relations in the unknown variable values x, y, z and b.

If $K \leq 5$, any four of these K-1 relations alone suffice to determine the variable values x, y, z and b. In this instance, the four relations in Eq. (4) for determination of the location coordinates (x,y,z) and the equivalent time shift $b=c\tau$ can be set forth in matrix form as $$\begin{vmatrix} (x_1-x_2) & (y_1-y_2) & (z_1-z_2) & c\Delta t_{12} \\ (x_1-x_3) & (y_1-y_3) & (z_1-z_3) & c\Delta t_{13} \\ (x_1-x_4) & (y_1-y_4) & (z_1-z_4) & c\Delta t_{14} \\ (x_1-x_5) & (y_1-y_5) & (z_1-z_5) & c\Delta t_{15} \end{vmatrix} \begin{vmatrix} x \\ y \\ z \\ b \end{vmatrix} = \begin{vmatrix} \Delta D_{12} \\ \Delta D_{13} \\ \Delta D_{14} \\ \Delta D_{15} \end{vmatrix} \quad (6)$$

$$\Delta D_{12} = c^2 \cdot (\Delta t_1^2 - \Delta t_2^2)/2 - \{(x_1^2-x_2^2)+(y_1^2-y_2^2)+(z_1^2-z_2^2)\}/2, \quad (7-1)$$

$$\Delta D_{13} = c^2 \cdot (\Delta t_1^2 - \Delta t_3^2)/2 - \{(x_1^2-x_3^2)+(y_1^2-y_3^2)+(z_1^2-z_3^2)\}/2, \quad (7-2)$$

$$\Delta D_{14} = c^2 \cdot (\Delta t_1^2 - \Delta t_4^2)/2 - \{(x_1^2-x_4^2)+(y_1^2-y_4^2)+(z_1^2-z_4^2)\}/2, \quad (7-3)$$

$$\Delta D_{15} = c^2 \cdot (\Delta t_1^2 - \Delta t_5^2)/2 - \{(x_1^2-x_5^2)+(y_1^2-y_5^2)+(z_1^2-z_5^2)\}/2, \quad (7-4)$$

If, as required here, any three of the receivers are noncollinear and the five receivers do not lie in a common plane, the 4×4 matrix in Eq. (6) has a non-zero determinant and Eq. (6) has a solution (x,y,z,b).

If K=4, the three relations in Eq. (4) plus one additional relation can determine the unknown values. To develop this additional relation, express Eqs. (4) in matrix form as $$\begin{vmatrix} (x_1-x_2) & (y_1-y_2) & (z_1-z_2) \\ (x_1-x_3) & (y_1-y_3) & (z_1-z_3) \\ (x_1-x_4) & (y_1-y_4) & (z_1-z_4) \end{vmatrix} \begin{vmatrix} x \\ y \\ z \end{vmatrix} = \begin{vmatrix} \Delta D_{12} - b \cdot c\Delta t_{12}, \\ \Delta D_{13} - b \cdot c\Delta t_{13}, \\ \Delta D_{14} - b \cdot c\Delta t_{14}, \end{vmatrix} \quad (8)$$

$$\Delta D_{12} = c^2 \cdot (\Delta t_1^2 - \Delta t_2^2)/2 - \{(x_1^2-x_2^2)+(y_1^2-y_2^2)+(z_1^2-z_2^2)\}/2, \quad (9-1)$$

$$\Delta D_{13} = c^2 \cdot (\Delta t_1^2 - \Delta t_3^2)/2 - \{(x_1^2-x_3^2)+(y_1^2-y_3^2)+(z_1^2-z_3^2)\}/2, \quad (9-2)$$

$$\Delta D_{14} = c^2 \cdot (\Delta t_1^2 - \Delta t_4^2)/2 - \{(x_1^2-x_4^2)+(y_1^2-y_4^2)+(z_1^2-z_4^2)\}/2, \quad (9-3)$$

These last relations are inverted to express x, y and z in terms of b:

$$M^{-1} \begin{vmatrix} \Delta D_{12} - b \cdot c\Delta t_{12}, \\ \Delta D_{13} - b \cdot c\Delta t_{13}, \\ \Delta D_{14} - b \cdot c\Delta t_{14}, \end{vmatrix} = \begin{vmatrix} x \\ y \\ z \end{vmatrix} \quad (10)$$

$$M = \begin{vmatrix} (x_1-x_2) & (y_1-y_2) & (z_1-z_2) \\ (x_1-x_3) & (y_1-y_3) & (z_1-z_3) \\ (x_1-x_4) & (y_1-y_4) & (z_1-z_4) \end{vmatrix} \quad (11)$$

$$M^{-1} = \begin{vmatrix} m'_{11} & m'_{12} & m'_{13} \\ m'_{21} & m'_{22} & m'_{23} \\ m'_{31} & m'_{32} & m'_{33} \end{vmatrix}, \quad (12)$$

$$x = m'_{11}(\Delta D_{12} - b \cdot c\Delta t_{12}) + m'_{12}(\Delta D_{13} - b \cdot c\Delta t_{13}) + m'_{13}(\Delta D_{14} - b \cdot c\Delta t_{14}), \quad (13-1)$$

$$y = m'_{21}(\Delta D_{12} - b \cdot c\Delta t_{12}) + m'_{22}(\Delta D_{13} - b \cdot c\Delta t_{13}) + m'_{23}(\Delta D_{14} - b \cdot c\Delta t_{14}), \quad (13-2)$$

$$x = m'_{31}(\Delta D_{12} - b \cdot c\Delta t_{12}) + m'_{32}(\Delta D_{13} - b \cdot c\Delta t_{13}) + m'_{33}(\Delta D_{14} - b \cdot c\Delta t_{14}), \quad (13-3)$$

These expressions for x, y and z in terms of b in Eq. (10) are inserted into the "square" of Eq. (1), $$\{(x-x_1)^2+(y-y_1)^2+(z-z_1)^2\}=(c\Delta t_1)^2-2b \cdot c\Delta t_1+b^2, \quad (14)$$

to provide a quadrative equation for b, $$A \cdot b^2 - 2B \cdot b + C = 0, \quad (15)$$

$$A = \{m'_{11}\Delta t_{12}+m'_{12}\Delta t_{13}+m'_{13}\Delta t_{14}\}^2+\{m'_{21}\Delta t_{12}+m'_{22}\Delta t_{13}+m'_{23}\Delta t_{14}\}^2+\{m'_{31}\Delta t_{12}+m'_{32}\Delta t_{13}+m'_{33}\Delta t_{14}\}^2, \quad (16\text{-}1)$$

$$B = \{m'_{11}\Delta D_{12}+m'_{12}\Delta D_{13}+m'_{13}\Delta D_{14}-x_1\}\{m'_{11}\Delta t_{12}+m'_{12}\Delta t_{13}+m'_{13}\Delta t_{14}\}+\{m'_{11}\Delta D_{12}+m'_{12}\Delta D_{13}+m'_{13}\Delta D_{14}-y_1\}\{m'_{11}\Delta t_{12}+m'_{12}\Delta t_{13}+m'_{13}\Delta t_{14}\}+\{m'_{11}\Delta D_{12}+m'_{12}\Delta D_{13}+m'_{13}\Delta D_{14}-z_1\}\{m'_{11}\Delta t_{12}+m'_{12}\Delta t_{13}+m'_{13}\Delta t_{14}\}, \quad (16\text{-}2)$$

$$C = \{m'_{11}\Delta D_{12}+m'_{12}\Delta D_{13}+m'_{13}\Delta D_{14}-x_1\}^2+\{m'_{21}\Delta D_{12}+m'_{22}\Delta D_{13}+m'_{23}\Delta D_{14}-y_1\}^2+\{m'_{31}\Delta D_{12}+m'_{32}\Delta D_{13}+m'_{33}\Delta D_{14}-z_1\}^2, \quad (16\text{-}3)$$

The solution b having the smaller magnitude is preferably chosen as the solution to be used. Equations (15) and (13-j) (j=1, 2, 3) provide a solution quadruple (x,y,z,b) for K=4. This solution quadruple (x,y,z,b) is exact, does not require iterations or other approximations, and can be determined in one pass.

This approach can be used, for example, where a short range radio frequency identifier device (RFID) or other similar signal source provides a signal that is received by each of K signal receivers 11-k. The signal source may have its own power source (e.g., a battery), which must be replaced from time to time.

Alternatively, each of the K ($K \leq 3$) signal transceivers 21-k can serve as an initial signal source, as illustrated in FIG. 2. Each initial signal source 21-k emits a signal having a distinctive feature (e.g., frequency, signal shape, signal content, signal duration) at a selected time, $t=t_{e,k}$, and each of these signals is received by a target receiver 23 at a subsequent time, $t=t_{r,k}$. After a selected non-negative time delay of length $\Delta t_{d,k}$ ($\leq 0$), the target receiver 23 emits a (distinctive) return signal, which is received by the transceiver 21-k at a final time, $t = t_{f,k} = t_{e,k} + 2(t_{r,k} - t_{e,k}) + \Delta t_k$. The time interval length for one-way propagation from the initial signal source 21-k to the target receiver 23 is thus $$\Delta t_k = t_{r,k} - t_{e,k} = \{t_{f,k} - t_{e,k} - \Delta t_{d,k}\}/2 \quad (k=1, \ldots, K), \qquad (17)$$

and the time intervals $\Delta t_k$ set forth in Eq. (14) can be used as discussed in connection with Eqs. (1)-(17). However, in this alternative, times at the initial signal sources 21-k are coordinated, and any constant time shift b at target receiver 23 is irrelevant, because only the time differences (of lengths $\Delta t_{r,k}$) are measured or used to determine the time(s) at which the return signal(s) are emitted. Thus, b=0 in this alternative, and the relation corresponding to Eq. (10) (with b=0) provides the solution coordinates (x,y,z).

The method set forth in connection with Eqs. (1)-(7-4) for K≤5 receivers, and the method set forth in connection with Eqs. (1)-(17) for K=4 receivers, will be referred to collectively as a "quadratic analysis process" to determine location coordinates (x,y,z) and equivalent time shift b for a mobile object or Carrier.

Determination of Spatial Orientation Relations

The preceding determines location of a single (target) receiver that may be carried on a person or other mobile object (hereafter referred to as a "Carrier"). Spatial orientation of the Carrier can be estimated by positioning three or more spaced apart, noncollinear target receivers on the Carrier and determining the three-dimensional location of each target receiver at a selected time, or within a time interval of small length (e.g., 0.5–5 sec). Where the Carrier is a person, the target receivers may, for example, be located (91) on or adjacent to the Carrier's head and (2 and 3) at two or more spaced apart, noncollinear locations on the Carrier's back, shoulders, arms, waist or legs.

Three spaced apart locations determine a plane Π in 3-space, and this plane Π can be determined by a solution (a,b,c) of the three relations $$x \cdot \cos\alpha + y \cdot \cos\beta + z \cdot \cos\gamma = p, \qquad (18)$$

where $\alpha$, $\beta$ and $\gamma$ are direction cosines of a vector V, drawn from the coordinate origin to the plane Π and perpendicular Π, and p is a (signed) length of V (W. A. Wilson and J. I. Tracey, *Analytic Geometry*, D.C. Heath publ., Boston, Third Ed. 1946, pp. 266-267). Where three noncollinear points, having Cartesian coordinates $(x_i, y_i, z_i)$ (I=1, 2, 3), lie in the plane Π, these coordinates must satisfy the relations $$x_i \cdot \cos\alpha + y_i \cdot \cos\beta + z_i \cdot \cos\gamma = p, \qquad (19)$$

and the following difference equations must hold:

$$(x_2 - x_1) \cdot \cos\alpha + (y_2 - y_1) \cdot \cos\beta + (z_2 - z_1) \cdot \cos\gamma = 0, \qquad (20\text{-}1)$$

$$(x_3 - x_1) \cdot \cos\alpha + (y_3 - y_1) \cdot \cos\beta + (z_3 - z_1) \cdot \cos\gamma = 0. \qquad (20\text{-}2)$$

Multiplying Eq. (20-1) by $(z_3 - z_1)$, multiplying Eq. (20-2) by $(z_2 - z_1)$, and subtracting the resulting relations from each other, one obtains $$\{(z_3 - z_1)(x_2 - x_1) - (z_2 - z_1)(x_3 - x_1)\}\cos\alpha + \{(z_3 - z_1)(y_2 - y_1) - (z_2 - z_1)(y_3 - y_1)\}\cos\beta = 0, \qquad (21)$$

Figure 20:
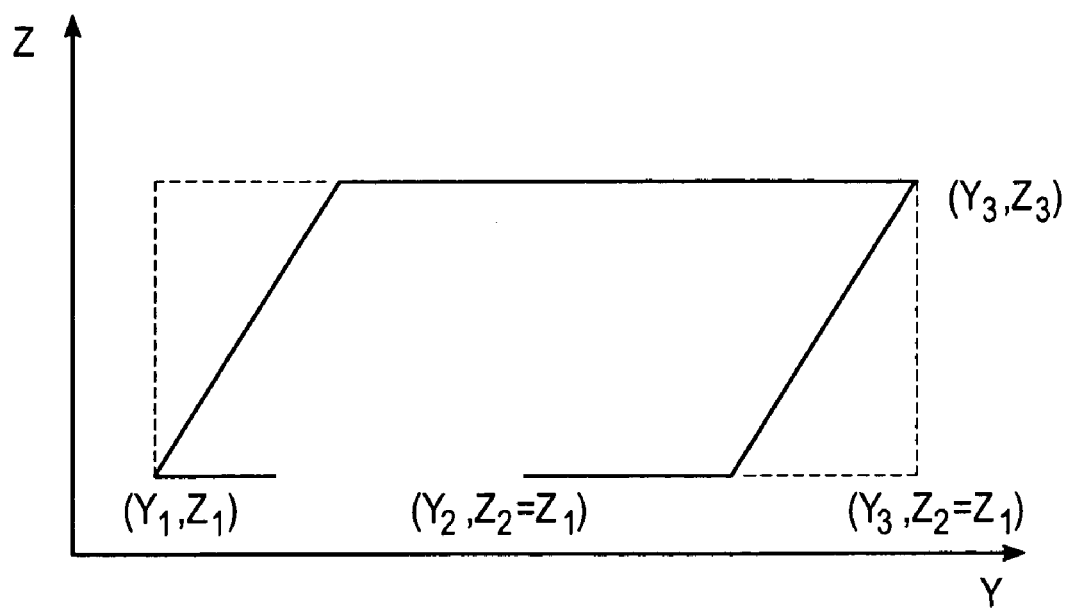
FIG. 20 illustrates a demonstration that a parallelogram has non-zero area.

The coefficient $\{(z_3 - z_1)(y_2 - y_1) - (z_2 - z_1)(y_3 - y_1)\}$ of $\cos\beta$ is the (signed) area of a parallelogram, rotated to lie in a yz-plane and illustrated in FIG. 20, and is non-zero because the three points $(x_i, y_i, z_i)$ are noncollinear. With $z_2 = z_1$ as in FIG. 20, the parallelogram area is computed as follows:

$$\text{Area} = (z_3 - z_1)(y_3 - y_1) = (z_3 - z_1)(y_2 - y_1) - (z_2 - z_1)(y_3 - y_2) \neq 0. \qquad (22)$$

Equation (21) has a solution $$\cos\beta = -\{(z_3 - z_1)(x_2 - x_1) - (z_2 - z_1)(x_3 - x_1)\}\cos\alpha / \{(z_3 - z_1)(y_2 - y_1) - (z_2 - z_1)(y_3 - y_1)\} \qquad (23)$$

Multiplying Eq. (20-1) by $(y_3 - y_1)$, multiplying Eq. (20-2) by $(y_2 - y_1)$, and substracting the resulting relations, one obtains by analogy a solution $$\cos\beta = -\{(y_3 - y_1)(x_2 - x_1) - (y_2 - y_1)(x_3 - x_1)\}\cos\alpha / \{(z_3 - z_1)(y_2 - y_1) - (z_2 - z_1)(y_3 - y_1)\}. \qquad (24)$$

Utilizing the normalization relation for direction cosines, $$\cos^2\alpha + \cos^2\beta + \cos^2\gamma = 1, \qquad (25)$$

one obtains from Eqs. (23), (24) and (25) a solution $$\cos\alpha = (\pm 1)/\{1 + \{(z_3 - z_1)(x_2 - x_1) - (z_2 - z_1)(x_3 - x_1)\}^2 / \{(z_3 - z_1)(y_2 - y_1) - (z_2 - z_1)(y_3 - y_1)\}^2 + \{(y_3 - y_1)(x_2 - x_1) - (y_2 - y_1)(x_3 - x_1)\}/\{(z_3 - z_1)(y_2 - y_1) - (z_2 - z_1)(y_3 - y_1)\}^2\}^{1/2}. \qquad (26)$$

Equations (23), (24) and (26) provide a solution for the direction cosines, $\cos\alpha$, $\cos\beta$, and $\cos\gamma$, apart from the signum in Eq. (26). The signum (±1) in Eq. (26) is to be chosen to satisfy Eq. (18) after the solution is otherwise completed. The (signed) length p can be determined form Eq. (18) for, say, $(x_1, y_1, z_1)$.

A fourth point, having location coordinates $(x, y, z) = (x_4, y_4, z_4)$, lies on the same side of the plane π as does the origin if $$x_4 \cdot \cos\alpha + y_4 \cdot \cos\beta + z_4 \cdot \cos\alpha\gamma = p_4 < p, \qquad (27\text{-}1)$$

lies on the opposite side of the plane H from the origin if $$x_4 \cdot \cos\alpha + y_4 \cdot \cos\beta + z_4 \cdot \cos\alpha\gamma = p_4 > p, \qquad (27\text{-}2)$$

and lies on the plane Π if $$x_4 \cdot \cos\alpha + y_4 \cdot \cos\beta + z_4 \cdot \cos\alpha\gamma = p_4 = p, \qquad (27\text{-}3)$$

The fourth point may have location coordinates that initially place this point in the plane Π, for example, within a triangle Tr initially defined by the other three points $(x_i, y_i, z_i)$. As a result of movement of the Carrier associated with the RFIDs, the fourth point may no longer lie in the (displaced) plane Π and may lie to one side or to the other side of Π. From this movement of the fourth point relative to Π, one infers that the Carrier has shifted and/or distorted its position, relative to its initial position.

The analysis presented here in connection with Eqs. (18)-(27-3) will be referred to collectively as a "quadratic orientation analysis process."

An initial set of spatial orientation parameters $(\alpha 0, \beta 0, \gamma 0, p0)$ may be specified, and corresponding members of a subsequent set $(\alpha, \beta, \gamma, p)$ can be compared with $(\alpha 0, \beta 0, \gamma 0, p0)$ to determine which of these parameters has changed substantially As an example, the Carrier may be an ESW, and the initial plane Π may be substantially horizontal, having direction cosines $\cos\alpha \approx 0$, $\cos\beta \approx 0$ and $\cos\gamma \approx 1$ (e.g., $\cos\gamma \geq 0.97$). If, at a subsequent time, $\cos\gamma \leq 0.7$ for a substantial time interval, corresponding to a Carrier "lean" angle of at least 45°, relative to a vertical direction, the system may conclude that the Carrier is no longer erect and may be experiencing physical or medical problems.

As another example, if $(\alpha 0, \beta 0, \gamma 0)$ are substantially unchanged from their initial or reference values but the parameter p is changing substantially, this indicates that the Carrier is moving, without substantial change in the initial posture of the Carrier.

Glossary

ESW=emergency services worker
ES (appliance)=emergency service appliance, used by an ESW (e.g., a fire hose)
AA=audio appliance
VA=visual appliance
EM(metric)=electrical field or magnetic field parameter value
RFID radio frequency identification device
ST=signal transmitter, which transmits, but does not necessarily receive, a signal
SR=signal receiver, which receives but does not necessarily transmit
STC=signal transceiver, which transmits and receives signals
TST=thermal sensor transmitter of at least one physical or chemical quantity) that transmits and receives
SST=sacrificial sensor transmitter that transmits a signal
SII=selected information item (examples in first embodiment)
RII=regional information item (examples in fifth embodiment)

What is claimed is:

1. A method for communicating information between a mobile object and an information receiver source, the method comprising:

distributing a plurality of N radio frequency signal transceiver devices ("STCs"), indexed as n=1, . . . , N with N≧3, as a mobile object moves within a region, where the STC numbers n and n+1 are spaced apart no further than a selected distance D/K, where D is no greater than a maximum distance of reliable signal transmission between two STCs and K is an integer selected from the integers {1, 2, 3, 4, 5};

causing STC no. n to transmit at least one selected information item to at least one of STC nos. n'=n−1, n−2, . . . , n−K, for n=K+1, K+2, . . . , N, where the selected information item is drawn from a group of items including STC no. for the original source of the information (referred to as the "source-STC"); location of the source-STC that is presently transmitting the information; temperature at the source-STC location; pressure at the source-STC location; concentration of a specified chemical or compound at the source-STC location; electromagnetic field intensity at the source-STC location; a visible light index at the source-STC location; average noise intensity at the source-STC location; peak noise intensity at the source-STC location; flux of nuclear particles (alpha, beta, gamma and/or ion) at the source-STC location; and estimated oxygen content at the source-STC location; and causing at least one of the STCs no. 1, 2, . . . , K to transmit the at least one selected information item to a signal receiver for analysis of the transmitted signal.

2. The method of claim 1, further comprising causing said STC no. n' that receives said at least one selected information item from said STC no. n to transmit said at least one selected information item to at least one of said STC nos. n"=n'−1, n'−2, . . . , n'−K.

3. The method of claim 1, further comprising choosing at least one of said STCs to be a RFID.

4. A method for determining location of a non-stationary object, the method comprising:

providing a radio frequency signal transmitter ("ST") that is attached to or carried by a non-stationary object;
causing the ST to transmit a ST signal at a selected time;
receiving the transmitted ST signal at each of N spaced apart, noncollinear radio frequency signal receivers ("SRs") at known locations, and measuring an elapsed time for propagation of a received signal from the ST to each SR, with N≧3; and
estimating location coordinates for the ST, based upon comparison of the measured elapsed times, using a quadratic location analysis process.

5. The method of claim 4, further comprising choosing at least one of said ST and said N STCs to be a RFID.

6. A method for determining location of a non-stationary object, the method comprising:

providing N spaced apart, noncollinear radio frequency signal transceivers ("source-STCs") at known locations, numbered n=1, . . . , N, where source-STC no, n transmits a distinguishable first signal S1(n);
providing a mobile radio frequency signal transceiver ("mobile STC") that is attached to or carried by a non-stationary object, where the mobile STC transmits a second distinguishable signal S2(n), after a selected non-negative time delay, in response to receipt of the first signal S1(n), where source-STC no. n receives the second distinguishable signal S2(n) and measures an elapsed time between transmission of the first signal S1(n) and receipt of the second signal S2(n); and
estimating location coordinates for the mobile STC, based upon comparison of the measured elapsed times and using a quadratic location analysis process.

7. The method of claim 6, further comprising choosing at least one of said mobile STC and said N source-STCs to be a RFID.

8. A method for determining location of an non-stationary object, the method comprising:

providing at least three spaced apart, noncollinear radio frequency signal transceivers ("source-STCs") at known locations, numbered n=n1, n2, n3, . . . with n1≠n2≠n3≠n1, where source-STC no. n transmits a distinguishable first signal S1(n);
providing a mobile radio frequency signal transceiver ("mobile STC") that is attached to or carried by a non-stationery object, where the mobile STC: (i) receives a signal S1(n1) and, after a known time delay $\Delta t(n1)$, transmits a distinguishable signal S2(n1) that is received by the STC number n2; (ii) receives a signal S1(n2) and, after a known time delay $\Delta t(n2)$, transmits a distinguishable signal S2(n2) that is received by the STC number n3; and (iii) receives a signal S1(n3) and, after a known time delay $\Delta t(n3)$, transmits a distinguishable signal S2(n3) that is received by the STC number n3;
estimating elapsed times, T(1,r), T(2,r) and T(3,r), for signal propagation between the STC number n1 and the mobile STC, between the STC number n2 and the mobile STC, and between the STC number n3 and the mobile STC, respectively; and
estimating location coordinates for the mobile STC, based upon comparison of the measured elapsed times and using a quadratic location analysis process.

9. The method of claim 8, further comprising choosing at least one of said mobile STC and said N source-STCs to be a RFID.

10. A method for determining spatial orientation of M non-stationary objects, the method comprising:

providing M radio frequency signal transmitters ("STs") that are attached to or carried by the M non-stationery objects, numbered m=1, . . . , M, at spaced apart, noncollinear positions, where ST no. m transmits a distinguishable ST signal at each of two or more selected spaced apart times and M≧3;

receiving each of the transmitted ST signals at each of N spaced apart radio frequency signal receivers ("SRs") at known locations, no three of which are collinear, and measuring an elapsed time for propagation of a received signal from each ST to each SR, with N≧3;

estimating location coordinates for teach of the STs, based upon comparison of the measured elapsed times, using a quadratic location analysis process;

applying a quadratic orientation analysis process to the location coordinates for each of the STs to estimate orientation parameters $(\alpha,\beta,\gamma,p)$ for a plane Π defined by locations of at least three of the STs for a first selected time.

11. The method of claim 10, further comprising:

specifying a reference plane $\Pi_1$ that is defined by said orientation parameters $(\alpha,\beta,\gamma,p)$ for said first selected time;

estimating orientation parameters $(\alpha',\beta',\gamma',p')$ for a second selected time that defines a second plane $\Pi_2$; and comparing at least one of the orientation parameters $(\alpha',\beta',\gamma',p')$ with a corresponding one of said orientation parameters $(\alpha,\beta,\gamma,p)$ to determine a change, if any, in orientation of the plane $\Pi_2$ with respect to said plane $\Pi_1$.

12. The method of claim 10, further comprising choosing at least one of said M mobile STCs and said N source-STCs to be a RFID.

13. A method for determining spatial orientation of a non-stationary object, the method comprising:

providing N radio frequency signal source-transceivers ("source-STCs") that are spaced apart at known locations, no three of which are collinear, numbered n=1, ..., N (N≧3), where source-STC no. n transmits a distinguishable signal S1(n);

providing M radio frequency signal mobile transmitters ("mobile STCs"), numbered m=1, ..., M (M>3), that are attached to or carried by a non-stationery object at spaced apart locations, no three of which are collinear, where each mobile STC receives each signal S1(n) and, after a time delay of length Δt(n), transmits a distinguishable mobile STC signal S2(n) at each of two or more selected spaced apart times, and where each signal S2(n) is received by at least one of the source-STCs;

determining at least one of (i) a time of propagation of the signal S1(n) from the source-STC number n to the mobile STC number m and (ii) a time of propagation of the signal S2(n) from the mobile STC number m to the source-STC number n, for each source-STC number n and each mobile STC number m estimating location coordinates for each of the mobile STCs, based upon comparison of the measured times of signal propagation, using a quadratic location analysis process; and applying a quadratic orientation analysis process to the location coordinates for each of the STCs to estimate orientation parameters $(\alpha,\beta,\gamma,p)$ for a plane Π defined by locations of at least three of the STCs for a first selected time.

14. The method of claim 13, further comprising:

specifying a reference plane $\Pi_1$ that is defined by said orientation parameters $(\alpha,\beta,\gamma,p)$ for said first selected time;

estimating orientation parameters $(\alpha',\beta',\gamma',p')$ for a second selected time that defines a second plane $\Pi_2$; and comparing at least one of the orientation parameters $(\alpha',\beta',\gamma',p')$ with a corresponding one of said orientation parameters $(\alpha,\beta,\gamma,p)$ to determine a change, if any, in orientation of the plane $\Pi_2$ with respect to said plane $\Pi_1$.

15. The method of claim 13, further comprising choosing at least one of said mobile STCs and said source-STCs to be a RFID.

16. A method for indicating a path from an initial location in a region toward an exit from the region, the method comprising:

providing N spaced apart radio frequency signal transceivers ("STCs"), numbered n=1, ..., N with N≧3, beginning at an initial location in a region and defining a path from the initial location toward, or in a direction of, an exit from the region;

causing STC no. n' (n'≧3) to emit a first audibly perceptible signal for a first time interval;

causing STC no. n'–1 to emit a second audibly perceptible signal, which is audibly distinguishable from the first audible signal, for a second time interval that follows and does not substantially overlap the first time interval; and causing STC no. n'–2 to emit a third audibly perceptible signal, which is audibly distinguishable from the first audible signal and from the second audible signal, for a third time interval that follows and does not substantially overlap the second time interval.

17. The method of claim 16, further comprising choosing said first, second and third audible signals to contain first, second and third frequencies that are audibly distinguishable from each other, where the second frequency is smaller than the first frequency and the third frequency is smaller than the second frequency.

18. The method of claim 16, further comprising choosing said first, second and third audible signals to contain first, second and third frequencies that are audibly distinguishable from each other, where the second frequency is larger than the first frequency and the third frequency is larger than the second frequency.

19. The method of claim 16, further comprising choosing said first, second and third audible signals to have sound intensities that are audibly distinguishable from each other, where the second sound intensity is smaller than the first sound intensity and the third sound intensity is smaller than the second sound intensity.

20. The method of claim 16, further comprising choosing said first, second and third audible signals to have sound intensities that are audibly distinguishable from each other, where the second sound intensity is greater than the first sound intensity and the third sound intensity is greater than the second sound intensity.

21. The method of claim 16, further comprising choosing at least one of said STCs to be a RFID.

22. A method for indicating a path from an initial location in a region toward an exit from the region, the method comprising:

providing N spaced apart radio frequency signal transceivers ("STCs"), numbered n=1, ..., N with N≧3, beginning at an initial location in a region and defining a path from the initial location toward an exit from the region;

causing STC no. n' (n'>3) to emit a first visually perceptible signal for a first time interval;

causing STC no. n'–1 to emit a second visually perceptible signal, which is audibly distinguishable from the first visual signal, for a second time interval that follows and does not substantially overlap the first time interval; and causing STC no. n'–2 to emit a third visually perceptible signal, which is audibly distinguishable from the first visual signal and from the second visual signal, for a third time interval that follows and does not substantially overlap the second time interval.

23. The method of claim 22, further comprising choosing said first, second and third visual signals to contain first, second and third wavelengths that are visually distinguishable from each other, where the second wavelength is smaller than the first wavelength and the third wavelength is smaller than the second wavelength.

24. The method of claim 22, further comprising choosing said first, second and third visual signals to contain first, second and third wavelengths that are visually distinguishable from each other, where the second wavelength is greater than the first wavelength and the third wavelength is greater than the second wavelength.

25. The method of claim 22, further comprising choosing said first, second and third visual signals to contain first, second and third light intensities that are visually distinguishable from each other, where the second light intensity is smaller than the first light intensity and the third light intensity is smaller than the second light intensity.

26. The method of claim 22, further comprising choosing said first, second and third visual signals to contain first, second and third light intensities that are visually distinguishable from each other, where the second light intensity is greater than the first light intensity and the third light intensity is greater than the second light intensity.

27. The method of claim 22, further comprising choosing at least one of said STCs to be a RFID.

28. A method of providing present information on a region or structure associated with a region, the method comprising:
   positioning a radio frequency signal receiver ("SR") at or adjacent to an entrance to a selected region or structure, where the SR has a memory that can be interrogated concerning information in the SR memory
   providing the SR memory with information concerning at least one of the following: date and time the information was last prepared or modified; presence or absence, within or adjacent to the region or structure, of at least one fluid or solid substance that can present a toxic, reactive ignitable or corrosive substance, presence or absence, within or adjacent to the region or structure, of at least one fluid or solid substance that can present a chemical hazard, presence or absence ,within or adjacent to the region or structure, of at least one fluid or solid substance that can present a biological hazard, presence or absence, within or adjacent to the region or structure, of at least one fluid or solid substance that can present an explosion hazard, presence or absence, within or adjacent to the region or structure, of at least one fluid or solid substance that can present a nuclear hazard, presence or absence, within or adjacent to the region or structure, of any structural condition that may cause or contribute to a structural collapse; and
   remedial action, if any, taken in response to a condition associated with the region or structure.

29. The method of claim 28, further comprising:
   providing at least a selected portion of said SR memory with a first indicium;
   receiving a request for access to information contained in the selected portion of said SR memory;
   determining if the request contains a second indicium that corresponds to the first indicium;
   when either (i) the request does not contain a second indicium or (ii) the request contains a second indicium that does not correspond to the first indicium, declining to permit access to said information contained in the selected portion SR memory.

30. The method of claim 29, further comprising:
   when said request contains a second indicium that corresponds to said first indicium, permitting access to said information contained in said selected portion of said SR memory.

31. The method of claim 28, further comprising choosing said first indicium and said second indicium to be substantially identical.

32. The method of claim 28, further comprising choosing said second indicium to be S-complementary to at least part of said first indicium.

33. The method of claim 28, further comprising choosing said SR to be a RFID.

34. A method of providing information on a present thermal condition of a region or structure, the method comprising:
   positioning a radio frequency sensor-signal transmitter ("SST") within or adjacent to a region or structure, where the SST comprises a thermal sensor that senses a local temperature T(t) at a sequence of times and computes a thermal load parameter, defined as $$TL(t) = \int_{t0}^{t} \{H\{T(t')-T(thr)\}\}^p dt', \quad (2)$$

where t0 is a selected time value, $H\{x\}=x$ ($x>0$) and $H\{x\}=$ ($x<0$), T(thr) is an estimated temperature at which thermal breakdown of some at least one object within or adjacent to the region or structure becomes serious and p is a selected positive exponent; and
   when TL(t) exceeds a selected threshold value TL(thr), providing at least one of an audible signal and a visual signal that indicates that the object is approaching, or has reached, a material breakdown.

35. The method of claim 34, further comprising choosing said SST to be a RFID.

36. A method of providing information on a present thermal condition of a region or structure, the method comprising:
   providing a radio frequency sensor-signal transmitter "SST") that is at least partly enclosed by a layer of electromagnetically responsive material that melts or otherwise dissociates at or near a selected temperature T(melt);
   providing an electrical current source connected between first and second spaced apart locations on the responsive material, and measuring at least one of (i) an electrical current value between the first and second locations, (ii) an electrical resistance associated with a current path between the first and second locations and (iii) a magnetic permeability associated with a path between the first and second locations; and
   when at least one of the conditions (i) the measured electrical current value differs substantially from a nominal electrical current value, (ii) the measured electrical resistance value differs substantially from a nominal electrical resistance value and (iii) the measured magnetic permeability value differs substantially from a nominal magnetic permeability value, is satisfied, issuing at least one of an audible signal and a visual signal indicating that the responsive material is approaching, or has reached, a material breakdown.

37. The method of claim 36, further comprising choosing said SST to be a RFID.

* * * * *